US008408993B2

(12) United States Patent
Lafky et al.

(10) Patent No.: US 8,408,993 B2
(45) Date of Patent: Apr. 2, 2013

(54) GAMING METHOD AND DEVICE INVOLVING PROGRESSIVE WAGERS

(75) Inventors: Ernie M. Lafky, San Francisco, CA (US); Mark C. Nicely, Daly City, CA (US)

(73) Assignee: IGT, Reno, NV (US)

( * ) Notice: Subject to any disclaimer, the term of this patent is extended or adjusted under 35 U.S.C. 154(b) by 510 days.

(21) Appl. No.: 12/684,355

(22) Filed: Jan. 8, 2010

(65) Prior Publication Data

US 2010/0197386 A1 Aug. 5, 2010

Related U.S. Application Data

(62) Division of application No. 11/196,645, filed on Aug. 2, 2005, now Pat. No. 7,666,093.

(60) Provisional application No. 60/598,305, filed on Aug. 3, 2004.

(51) Int. Cl.
*A63F 9/24* (2006.01)
*A63F 13/00* (2006.01)

(52) U.S. Cl. ................ 463/27; 463/16; 463/20; 463/21; 463/22; 463/25; 463/26; 463/42; 273/138.1; 273/138.2; 273/143 R

(58) Field of Classification Search .................... 463/16, 463/20, 21, 22, 25, 42, 26, 27; 273/138.1, 273/138.2, 143 R
See application file for complete search history.

(56) References Cited

U.S. PATENT DOCUMENTS

| | | | |
|---|---|---|---|
| 1,978,395 | A | 10/1934 | Groetchen |
| 2,545,644 | A | 3/1951 | Benton et al. |
| 2,743,108 | A | 4/1956 | Sanders |
| 2,942,574 | A | 6/1960 | Golay |
| 3,420,525 | A | 1/1969 | Waders |
| 3,618,019 | A | 11/1971 | Nemirovsky |
| 3,642,287 | A | 2/1972 | Lally et al. |
| 3,735,987 | A | 5/1973 | Ohki |
| 3,904,207 | A | 9/1975 | Gold |
| 3,971,557 | A | 7/1976 | Breslow et al. |
| 3,975,022 | A | 8/1976 | Figueroa |
| 3,998,309 | A | 12/1976 | Mandas et al. |
| 4,072,930 | A | 2/1978 | Lucero et al. |
| 4,182,515 | A | 1/1980 | Nemeth |

(Continued)

FOREIGN PATENT DOCUMENTS

| | | |
|---|---|---|
| AU | 524709 | 9/1982 |
| AU | 555905 | 10/1986 |

(Continued)

OTHER PUBLICATIONS

4DU Dice Unit Advertisement written by starpoint.uk.com, printed on Sep. 3, 2002.

(Continued)

*Primary Examiner* — Dmitry Suhol
*Assistant Examiner* — Ryan Hsu
(74) *Attorney, Agent, or Firm* — Neal, Gerber & Eisenberg LLP

(57) ABSTRACT

A method of gaming is disclosed wherein progressive award values may be increased in response to certain pre-established game outcomes, wager amounts or random events. The increased progressive award values may be based on a primary game or secondary game outcome. Another innovation is the resetting of progressive awards upon completion of a bonus event whether or not award actually won in said bonus event. Player tracking systems permit progressive award values to be linked to a particular player such that the progressive award values remain personal to the player. Re-setting increased progressive award values is also disclosed.

24 Claims, 14 Drawing Sheets

U.S. PATENT DOCUMENTS 4,198,052 A 4/1980 Gauselmann
4,238,127 A 12/1980 Lucero et al.
4,277,064 A 7/1981 Newman
4,283,709 A 8/1981 Lucero et al.
4,335,809 A 6/1982 Wain
4,363,485 A 12/1982 Edwall
4,409,656 A 10/1983 Andersen et al.
4,410,178 A 10/1983 Partridge
4,448,419 A 5/1984 Telnaes
4,494,197 A 1/1985 Troy et al.
4,560,161 A 12/1985 Hamano
4,573,681 A 3/1986 Okada
4,582,324 A 4/1986 Koza et al.
4,618,150 A 10/1986 Kimura
4,621,814 A 11/1986 Stepan et al.
4,624,459 A 11/1986 Kaufman
4,636,951 A 1/1987 Harlick
4,652,998 A 3/1987 Koza et al.
4,669,731 A 6/1987 Clarke
4,695,053 A 9/1987 Vazquez, Jr. et al.
4,721,307 A 1/1988 Okada
4,732,386 A 3/1988 Rayfiel
4,743,024 A 5/1988 Helm et al.
4,756,531 A 7/1988 DiRe et al.
4,760,527 A 7/1988 Sidley
4,775,155 A 10/1988 Lees
4,805,907 A 2/1989 Hagiwara
4,836,546 A 6/1989 DiRe et al.
4,837,728 A 6/1989 Barrie et al.
4,838,552 A 6/1989 Hagiwara
4,842,278 A * 6/1989 Markowicz ..................... 463/18
4,844,464 A 7/1989 Berge
4,856,787 A 8/1989 Itkis
4,861,041 A 8/1989 Jones et al.
4,871,171 A 10/1989 Rivero
4,880,237 A 11/1989 Kishishita
4,926,327 A 5/1990 Sidley
4,948,134 A 8/1990 Suttle et al.
4,964,638 A 10/1990 Ishida
4,991,848 A 2/1991 Greenwood et al.
5,019,973 A 5/1991 Wilcox et al.
5,033,744 A 7/1991 Bridgeman et al.
5,038,022 A 8/1991 Lucero
5,046,737 A 9/1991 Fienberg
5,048,833 A 9/1991 Lamle
5,058,893 A 10/1991 Bertram et al.
5,074,559 A 12/1991 Okada
5,092,598 A 3/1992 Kamille
5,116,055 A 5/1992 Tracy
5,123,649 A 6/1992 Tiberio
5,127,651 A 7/1992 Okada
5,152,529 A 10/1992 Okada
5,158,293 A 10/1992 Mullins
5,178,390 A 1/1993 Okada
5,205,555 A 4/1993 Hamano
5,209,479 A 5/1993 Nagao
5,217,224 A 6/1993 Sincock
5,249,800 A 10/1993 Hilgendorf et al.
5,259,616 A 11/1993 Bergmann
5,265,874 A 11/1993 Dickinson et al.
5,275,400 A 1/1994 Weingardt
5,276,312 A 1/1994 McCarthy
5,277,424 A 1/1994 Wilms
5,280,909 A 1/1994 Tracy
5,282,620 A * 2/1994 Keesee ............................ 463/20
5,286,023 A 2/1994 Wood
5,292,127 A 3/1994 Kelly et al.
5,308,065 A 5/1994 Bridgeman et al.
5,321,241 A 6/1994 Craine
5,324,035 A 6/1994 Morris et al.
5,326,104 A 7/1994 Pease et al.
5,332,228 A 7/1994 Schultz
5,342,047 A 8/1994 Heidel et al.
5,342,049 A 8/1994 Wichinsky et al.
5,344,144 A 9/1994 Canon
5,351,970 A 10/1994 Fioretti
5,364,100 A 11/1994 Ludlow et al.
5,377,993 A 1/1995 Josephs
5,380,007 A 1/1995 Travis et al.
5,393,057 A 2/1995 Marnell, II
5,393,061 A 2/1995 Manship et al.
5,395,111 A 3/1995 Inoue
5,398,932 A 3/1995 Eberhardt et al.
5,401,024 A 3/1995 Simunek
5,407,200 A 4/1995 Zalabak
5,411,271 A 5/1995 Mirando
5,417,430 A 5/1995 Breeding
5,423,539 A 6/1995 Nagao
5,429,361 A 7/1995 Raven et al.
5,431,408 A 7/1995 Adams
5,449,173 A 9/1995 Thomas et al.
5,456,465 A 10/1995 Durham
5,470,079 A 11/1995 LeStrange et al.
5,472,194 A 12/1995 Breeding et al.
5,476,259 A 12/1995 Weingardt
5,489,101 A 2/1996 Moody
5,511,781 A 4/1996 Wood
5,524,888 A 6/1996 Heidel
5,531,441 A 7/1996 Dabrowski et al.
5,536,016 A 7/1996 Thompson
5,542,669 A 8/1996 Charron et al.
5,544,892 A 8/1996 Breeding
5,544,893 A 8/1996 Jones et al.
5,547,192 A 8/1996 Ishibashi
5,560,603 A 10/1996 Seelig et al.
5,564,700 A 10/1996 Celona
5,566,337 A 10/1996 Szymanski
5,570,885 A 11/1996 Ornstein
5,577,959 A 11/1996 Takemoto
5,580,053 A 12/1996 Crouch
5,580,309 A 12/1996 Piechowiak et al.
5,584,485 A 12/1996 Jones et al.
5,584,763 A 12/1996 Kelly et al.
5,584,764 A 12/1996 Inoue
5,601,487 A 2/1997 Oshima
5,605,506 A 2/1997 Hoorn et al.
5,609,524 A 3/1997 Inoue
5,611,535 A 3/1997 Tiberio
5,611,730 A 3/1997 Weiss
5,622,366 A 4/1997 Inoue
5,626,341 A 5/1997 Jones
5,630,753 A * 5/1997 Fuchs ............................... 463/9
5,639,089 A 6/1997 Matsumoto et al.
5,641,050 A 6/1997 Smith et al.
5,641,730 A 6/1997 Brown
5,645,486 A 7/1997 Nagao et al.
5,647,592 A 7/1997 Gerow
5,647,798 A 7/1997 Falciglia
5,655,961 A 8/1997 Acres et al.
5,664,998 A 9/1997 Seelig et al.
5,674,128 A 10/1997 Holch et al.
5,702,304 A 12/1997 Acres et al.
5,707,285 A 1/1998 Place et al.
5,707,286 A 1/1998 Carlson
5,711,525 A 1/1998 Breeding
5,720,483 A 2/1998 Trinh
5,722,891 A 3/1998 Inoue
5,732,948 A 3/1998 Yoseloff
5,741,183 A 4/1998 Acres et al.
5,743,523 A 4/1998 Kelly et al.
5,743,524 A 4/1998 Nannicola
5,743,526 A 4/1998 Inoue
5,743,800 A 4/1998 Huard et al.
5,752,881 A 5/1998 Inoue
5,752,882 A 5/1998 Acres et al.
5,755,619 A 5/1998 Matsumoto et al.
5,761,647 A 6/1998 Boushy
5,762,552 A 6/1998 Vuong
5,766,076 A 6/1998 Pease et al.
5,769,716 A 6/1998 Saffari et al.
5,772,506 A 6/1998 Marks et al.
5,772,509 A 6/1998 Weiss
5,772,511 A 6/1998 Smeltzer
RE35,864 E 7/1998 Weingardt
5,775,692 A 7/1998 Watts et al.
5,779,544 A 7/1998 Seelig et al.
5,779,545 A 7/1998 Berg et al.

| | | | |
|---|---|---|---|
| 5,779,547 | A | 7/1998 | SoRelle et al. |
| 5,779,549 | A | 7/1998 | Walker et al. |
| 5,788,573 | A | 8/1998 | Baerlocher et al. |
| 5,800,269 | A | 9/1998 | Holch et al. |
| 5,806,855 | A | 9/1998 | Cherry |
| 5,807,172 | A | 9/1998 | Piechowiak |
| 5,816,918 | A | 10/1998 | Kelly et al. |
| 5,820,459 | A | 10/1998 | Acres et al. |
| 5,823,872 | A | 10/1998 | Prather et al. |
| 5,823,873 | A | 10/1998 | Moody |
| 5,823,874 | A | 10/1998 | Adams |
| D400,597 | S | 11/1998 | Hedrick et al. |
| 5,833,536 | A | 11/1998 | Davids et al. |
| 5,833,537 | A | 11/1998 | Barrie |
| 5,833,538 | A | 11/1998 | Weiss |
| 5,833,540 | A | 11/1998 | Miodunski et al. |
| 5,836,817 | A | 11/1998 | Acres et al. |
| D402,702 | S | 12/1998 | Seelig et al. |
| 5,848,932 | A | 12/1998 | Adams |
| 5,851,011 | A | 12/1998 | Lott |
| 5,851,147 | A | 12/1998 | Stupak |
| 5,851,149 | A | 12/1998 | Xidos et al. |
| 5,855,514 | A | 1/1999 | Kamille |
| 5,855,515 | A | 1/1999 | Pease et al. |
| 5,863,249 | A | 1/1999 | Inoue |
| 5,873,781 | A | 2/1999 | Keane |
| D406,865 | S | 3/1999 | Heidel |
| 5,876,284 | A | 3/1999 | Acres et al. |
| 5,882,261 | A | 3/1999 | Adams |
| 5,885,157 | A | 3/1999 | Harada et al. |
| 5,885,158 | A | 3/1999 | Torango et al. |
| 5,890,962 | A | 4/1999 | Takemoto |
| 5,893,718 | A | 4/1999 | O'Donnell |
| 5,902,184 | A | 5/1999 | Bennett |
| 5,902,983 | A | 5/1999 | Crevelt et al. |
| 5,910,048 | A | 6/1999 | Feinberg |
| 5,911,418 | A | 6/1999 | Adams et al. |
| 5,919,088 | A | 7/1999 | Weiss |
| 5,927,714 | A | 7/1999 | Kaplan |
| 5,934,672 | A | 8/1999 | Sines et al. |
| 5,935,002 | A | 8/1999 | Falciglia |
| 5,941,773 | A | 8/1999 | Harlick |
| 5,944,606 | A | 8/1999 | Gerow |
| 5,947,820 | A | 9/1999 | Morro et al. |
| 5,947,822 | A | 9/1999 | Weiss |
| 5,951,011 | A | 9/1999 | Potter et al. |
| 5,951,397 | A | 9/1999 | Dickinson |
| 5,964,463 | A | 10/1999 | Moore, Jr. |
| 5,967,894 | A | 10/1999 | Kinoshita et al. |
| 5,976,015 | A | 11/1999 | Seelig et al. |
| 5,976,016 | A | 11/1999 | Moody et al. |
| 5,980,384 | A | 11/1999 | Barrie |
| 5,984,779 | A | 11/1999 | Bridgeman et al. |
| 5,984,781 | A | 11/1999 | Sunaga |
| 5,984,782 | A | 11/1999 | Inoue |
| 5,989,121 | A | 11/1999 | Sakamoto |
| 5,993,316 | A | 11/1999 | Coyle et al. |
| 5,997,400 | A | 12/1999 | Seelig et al. |
| 5,997,401 | A | 12/1999 | Crawford |
| 6,001,016 | A | 12/1999 | Walker et al. |
| 6,003,013 | A | 12/1999 | Boushy et al. |
| 6,004,207 | A | 12/1999 | Wilson, Jr. et al. |
| 6,007,066 | A | 12/1999 | Moody |
| 6,007,427 | A | 12/1999 | Wiener |
| 6,012,982 | A | 1/2000 | Piechowiak et al. |
| 6,015,346 | A | 1/2000 | Bennett |
| 6,016,338 | A | 1/2000 | Bansal et al. |
| 6,019,369 | A | 2/2000 | Nakagawa et al. |
| 6,032,955 | A | 3/2000 | Luciano et al. |
| 6,033,307 | A | 3/2000 | Vancura |
| 6,039,648 | A | 3/2000 | Guinn et al. |
| 6,039,649 | A | 3/2000 | Schulze |
| 6,045,129 | A | 4/2000 | Cooper et al. |
| 6,047,963 | A | 4/2000 | Pierce et al. |
| 6,048,269 | A | 4/2000 | Burns et al. |
| 6,050,895 | A | 4/2000 | Luciano et al. |
| 6,056,642 | A | 5/2000 | Bennett |
| 6,059,289 | A | 5/2000 | Vancura |
| 6,059,658 | A | 5/2000 | Mangano et al. |
| 6,062,979 | A | 5/2000 | Inoue |
| 6,062,980 | A | 5/2000 | Luciano |
| 6,062,981 | A | 5/2000 | Luciano, Jr. |
| 6,068,553 | A | 5/2000 | Parker |
| 6,077,162 | A * | 6/2000 | Weiss .............................. 463/26 |
| 6,080,062 | A | 6/2000 | Olson |
| 6,086,066 | A | 7/2000 | Takeuchi et al. |
| 6,089,976 | A | 7/2000 | Schneider et al. |
| 6,089,977 | A | 7/2000 | Bennett |
| 6,089,978 | A | 7/2000 | Adams |
| 6,089,980 | A | 7/2000 | Gauselmann |
| 6,093,102 | A | 7/2000 | Bennett |
| 6,099,408 | A | 8/2000 | Schneier et al. |
| 6,102,400 | A | 8/2000 | Scott et al. |
| 6,102,474 | A | 8/2000 | Daley |
| 6,102,798 | A | 8/2000 | Bennett |
| 6,102,799 | A | 8/2000 | Stupak |
| 6,105,962 | A | 8/2000 | Malavazos et al. |
| 6,110,039 | A | 8/2000 | Oh |
| 6,110,041 | A | 8/2000 | Walker et al. |
| 6,110,043 | A | 8/2000 | Olsen |
| 6,113,098 | A | 9/2000 | Adams |
| 6,117,009 | A | 9/2000 | Yoseloff |
| 6,117,013 | A | 9/2000 | Eiba |
| 6,120,031 | A | 9/2000 | Adams |
| 6,120,377 | A | 9/2000 | McGinnis, Sr. et al. |
| 6,120,378 | A | 9/2000 | Moody et al. |
| 6,126,541 | A | 10/2000 | Fuchs |
| 6,126,542 | A | 10/2000 | Fier |
| 6,129,355 | A | 10/2000 | Hahn et al. |
| 6,135,884 | A | 10/2000 | Hedrick et al. |
| 6,135,885 | A | 10/2000 | Lermusiaux |
| 6,139,013 | A | 10/2000 | Pierce et al. |
| 6,142,872 | A | 11/2000 | Walker et al. |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,149,156 | A | 11/2000 | Feola |
| 6,149,157 | A | 11/2000 | Suan |
| 6,149,521 | A | 11/2000 | Sanduski |
| 6,152,823 | A | 11/2000 | Lacoste et al. |
| 6,155,925 | A | 12/2000 | Giobbi et al. |
| 6,158,741 | A | 12/2000 | Koelling |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,162,122 | A | 12/2000 | Acres et al. |
| 6,165,070 | A | 12/2000 | Nolte et al. |
| 6,168,520 | B1 | 1/2001 | Baerlocher et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,183,366 | B1 | 2/2001 | Goldberg et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,193,606 | B1 | 2/2001 | Walker et al. |
| 6,203,010 | B1 | 3/2001 | Jorasch et al. |
| 6,203,429 | B1 | 3/2001 | Demar et al. |
| 6,203,430 | B1 | 3/2001 | Walker et al. |
| 6,206,374 | B1 | 3/2001 | Jones |
| 6,206,782 | B1 | 3/2001 | Walker et al. |
| D441,031 | S | 4/2001 | Seelig et al. |
| 6,210,275 | B1 | 4/2001 | Olsen |
| 6,210,277 | B1 | 4/2001 | Stefan |
| 6,210,279 | B1 | 4/2001 | Dickinson |
| 6,213,876 | B1 | 4/2001 | Moore, Jr. |
| 6,217,448 | B1 | 4/2001 | Olsen |
| 6,220,593 | B1 | 4/2001 | Pierce et al. |
| 6,220,959 | B1 | 4/2001 | Holmes, Jr. et al. |
| 6,220,961 | B1 | 4/2001 | Keane et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,970 | B1 | 5/2001 | Shimizu et al. |

| | | | | |
|---|---|---|---|---|
| 6,227,971 | B1 | 5/2001 | Weiss | |
| 6,231,442 | B1 | 5/2001 | Mayeroff | |
| 6,231,445 | B1 | 5/2001 | Acres | |
| 6,234,879 | B1 | 5/2001 | Hasegawa et al. | |
| 6,234,897 | B1 | 5/2001 | Frohm et al. | |
| 6,238,287 | B1 | 5/2001 | Komori et al. | |
| 6,238,288 | B1 | 5/2001 | Walker et al. | |
| D443,313 | S | 6/2001 | Brettschneider | |
| 6,241,608 | B1 | 6/2001 | Torango | |
| 6,244,958 | B1 | 6/2001 | Acres | |
| 6,251,013 | B1 | 6/2001 | Bennett | |
| 6,254,481 | B1 | 7/2001 | Jaffe | |
| 6,254,483 | B1 | 7/2001 | Acres | |
| 6,257,981 | B1 | 7/2001 | Acres et al. | |
| 6,261,128 | B1 | 7/2001 | Heim et al. | |
| 6,261,177 | B1 | 7/2001 | Bennett | |
| 6,264,557 | B1 | 7/2001 | Schneier et al. | |
| 6,267,669 | B1 | 7/2001 | Luciano, Jr. et al. | |
| 6,270,409 | B1 | 8/2001 | Shuster | |
| 6,270,411 | B1 | 8/2001 | Gura et al. | |
| 6,270,412 | B1 | 8/2001 | Crawford et al. | |
| 6,287,202 | B1 | 9/2001 | Pascal et al. | |
| 6,293,864 | B1 | 9/2001 | Romero | |
| 6,293,866 | B1 | 9/2001 | Walker et al. | |
| RE37,414 | E | 10/2001 | Harlick | |
| 6,299,165 | B1 | 10/2001 | Nagano | |
| 6,299,170 | B1 | 10/2001 | Yoseloff | |
| 6,302,398 | B1 | 10/2001 | Vecchio | |
| 6,302,790 | B1 | 10/2001 | Brossard | |
| 6,302,793 | B1 | 10/2001 | Fertitta, III et al. | |
| 6,305,686 | B1 | 10/2001 | Perrie et al. | |
| 6,309,298 | B1 | 10/2001 | Gerow | |
| 6,309,299 | B1 | 10/2001 | Weiss | |
| 6,309,300 | B1 | 10/2001 | Glavich | |
| 6,311,976 | B1 | 11/2001 | Yoseloff et al. | |
| 6,312,330 | B1 | 11/2001 | Jones et al. | |
| 6,312,332 | B1 | 11/2001 | Walker et al. | |
| 6,312,333 | B1 | 11/2001 | Acres | |
| 6,312,334 | B1 | 11/2001 | Yoseloff | |
| 6,315,660 | B1 | 11/2001 | DeMar et al. | |
| 6,315,662 | B1 | 11/2001 | Jorasch et al. | |
| 6,315,663 | B1 | 11/2001 | Sakamoto | |
| 6,315,664 | B1 | 11/2001 | Baerlocher et al. | |
| 6,319,122 | B1 | 11/2001 | Packes, Jr. et al. | |
| 6,319,123 | B1 | 11/2001 | Paludi | |
| 6,319,124 | B1 | 11/2001 | Baerlocher et al. | |
| 6,319,125 | B1 | 11/2001 | Acres | |
| 6,319,127 | B1 | 11/2001 | Walker et al. | |
| 6,322,078 | B1 | 11/2001 | Adams | |
| 6,322,309 | B1 * | 11/2001 | Thomas et al. | 413/20 |
| 6,328,649 | B1 | 12/2001 | Randall et al. | |
| 6,334,814 | B1 | 1/2002 | Adams | |
| 6,336,857 | B1 | 1/2002 | McBride | |
| 6,336,859 | B2 | 1/2002 | Jones et al. | |
| 6,336,860 | B1 | 1/2002 | Webb | |
| 6,336,862 | B1 | 1/2002 | Byrne | |
| 6,336,863 | B1 | 1/2002 | Baerlocher et al. | |
| 6,338,678 | B1 | 1/2002 | Seelig et al. | |
| 6,340,158 | B2 | 1/2002 | Pierce et al. | |
| 6,343,989 | B1 | 2/2002 | Wood et al. | |
| 6,345,824 | B1 | 2/2002 | Selitzky | |
| 6,346,043 | B1 | 2/2002 | Colin et al. | |
| 6,347,738 | B1 | 2/2002 | Crevelt et al. | |
| 6,347,996 | B1 | 2/2002 | Gilmore et al. | |
| 6,358,144 | B1 | 3/2002 | Kadlic et al. | |
| 6,358,149 | B1 | 3/2002 | Schneider et al. | |
| 6,361,441 | B1 | 3/2002 | Walker et al. | |
| 6,364,766 | B1 | 4/2002 | Anderson et al. | |
| 6,364,767 | B1 | 4/2002 | Brossard et al. | |
| 6,364,768 | B1 | 4/2002 | Acres et al. | |
| 6,364,769 | B1 | 4/2002 | Weiss et al. | |
| 6,368,216 | B1 | 4/2002 | Hedrick et al. | |
| 6,368,218 | B2 | 4/2002 | Angell, Jr. | |
| 6,371,852 | B1 | 4/2002 | Acres | |
| 6,375,187 | B1 | 4/2002 | Baerlocher et al. | |
| 6,375,567 | B1 | 4/2002 | Acres | |
| 6,375,568 | B1 | 4/2002 | Roffman et al. | |
| 6,375,569 | B1 | 4/2002 | Acres | |
| 6,375,570 | B1 | 4/2002 | Poole | |

| | | | |
|---|---|---|---|
| 6,386,974 | B1 | 5/2002 | Adams |
| 6,386,977 | B1 | 5/2002 | Hole |
| 6,398,218 | B1 | 6/2002 | Vancura |
| 6,398,220 | B1 | 6/2002 | Inoue |
| 6,398,644 | B1 | 6/2002 | Perrie et al. |
| 6,398,645 | B1 | 6/2002 | Yoseloff |
| 6,406,369 | B1 | 6/2002 | Baerlocher et al. |
| 6,413,160 | B1 | 7/2002 | Vancura |
| 6,416,408 | B2 | 7/2002 | Tracy et al. |
| 6,416,409 | B1 | 7/2002 | Jordan |
| 6,419,579 | B1 | 7/2002 | Bennett |
| 6,419,583 | B1 | 7/2002 | Crumby et al. |
| 6,428,412 | B1 | 8/2002 | Anderson et al. |
| 6,431,983 | B2 | 8/2002 | Acres |
| 6,435,500 | B2 | 8/2002 | Gumina |
| 6,435,511 | B1 | 8/2002 | Vancura et al. |
| 6,435,968 | B1 | 8/2002 | Torango |
| 6,439,993 | B1 | 8/2002 | O'Halloran |
| 6,439,995 | B1 | 8/2002 | Hughs-Baird et al. |
| 6,443,452 | B1 | 9/2002 | Brune |
| 6,443,837 | B1 | 9/2002 | Jaffe et al. |
| 6,450,884 | B1 | 9/2002 | Seelig et al. |
| 6,454,266 | B1 | 9/2002 | Breeding et al. |
| 6,454,651 | B1 | 9/2002 | Yoseloff |
| RE37,885 | E | 10/2002 | Acres et al. |
| 6,461,241 | B1 | 10/2002 | Webb et al. |
| 6,464,582 | B1 | 10/2002 | Baerlocher et al. |
| 6,471,208 | B2 | 10/2002 | Yoseloff et al. |
| 6,471,591 | B1 | 10/2002 | Crumby |
| D465,531 | S | 11/2002 | Luciano, Jr. et al. |
| 6,481,713 | B2 | 11/2002 | Perrie et al. |
| 6,482,089 | B2 | 11/2002 | Demar et al. |
| 6,491,584 | B2 | 12/2002 | Graham et al. |
| 6,494,454 | B2 | 12/2002 | Adams |
| 6,506,117 | B2 | 1/2003 | DeMar et al. |
| 6,506,118 | B1 | 1/2003 | Baerlocher et al. |
| 6,508,707 | B2 | 1/2003 | DeMar et al. |
| 6,511,375 | B1 | 1/2003 | Kaminkow |
| 6,511,376 | B2 | 1/2003 | Walker et al. |
| 6,514,141 | B1 | 2/2003 | Kaminkow et al. |
| 6,517,433 | B2 | 2/2003 | Loose et al. |
| 6,520,855 | B2 | 2/2003 | DeMar et al. |
| 6,533,273 | B2 | 3/2003 | Cole et al. |
| 6,533,658 | B1 | 3/2003 | Walker et al. |
| 6,533,660 | B2 | 3/2003 | Seelig et al. |
| 6,533,664 | B1 | 3/2003 | Crumby |
| 6,537,150 | B1 | 3/2003 | Luciano et al. |
| 6,537,152 | B2 | 3/2003 | Seelig et al. |
| 6,546,134 | B1 | 4/2003 | Shrairman et al. |
| 6,546,374 | B1 | 4/2003 | Esposito et al. |
| 6,547,131 | B1 | 4/2003 | Foodman et al. |
| 6,547,242 | B1 | 4/2003 | Sugiyama et al. |
| 6,554,283 | B2 | 4/2003 | Vancura et al. |
| 6,554,705 | B1 | 4/2003 | Cumbers |
| 6,561,904 | B2 | 5/2003 | Locke et al. |
| 6,565,434 | B1 | 5/2003 | Acres |
| 6,565,436 | B1 | 5/2003 | Baerlocher |
| 6,569,015 | B1 | 5/2003 | Baerlocher et al. |
| 6,572,471 | B1 | 6/2003 | Bennett |
| 6,575,830 | B2 | 6/2003 | Baerlocher et al. |
| 6,575,832 | B1 | 6/2003 | Manfredi et al. |
| 6,577,733 | B1 | 6/2003 | Charrin |
| 6,582,307 | B2 | 6/2003 | Webb |
| 6,589,115 | B2 | 7/2003 | Walker et al. |
| 6,592,458 | B1 | 7/2003 | Ho |
| 6,592,460 | B2 | 7/2003 | Torango |
| 6,595,853 | B1 | 7/2003 | Osawa |
| 6,595,854 | B2 | 7/2003 | Hughs-Baird et al. |
| 6,599,185 | B1 | 7/2003 | Kaminkow et al. |
| 6,599,186 | B1 | 7/2003 | Walker et al. |
| 6,599,188 | B2 | 7/2003 | Hirsch et al. |
| 6,599,190 | B2 | 7/2003 | Osawa |
| 6,599,193 | B2 | 7/2003 | Baerlocher et al. |
| 6,601,771 | B2 | 8/2003 | Charrin |
| 6,602,135 | B1 | 8/2003 | Gerrard |
| 6,602,137 | B2 | 8/2003 | Kaminkow et al. |
| 6,604,740 | B1 | 8/2003 | Singer et al. |
| 6,607,437 | B2 | 8/2003 | Casey et al. |
| 6,607,438 | B2 | 8/2003 | Baerlocher et al. |

| | | | | |
|---|---|---|---|---|
| 6,607,441 | B1 | 8/2003 | Acres | |
| 6,609,971 | B2 | 8/2003 | Vancura | |
| 6,609,972 | B2 | 8/2003 | Seelig et al. | |
| 6,609,973 | B1 | 8/2003 | Weiss | |
| 6,616,142 | B2 | 9/2003 | Adams | |
| 6,616,531 | B1 | 9/2003 | Mullins | |
| 6,620,046 | B2 | 9/2003 | Rowe | |
| 6,626,758 | B1 | 9/2003 | Parham et al. | |
| 6,634,944 | B2 | 10/2003 | Osawa | |
| 6,637,747 | B1 | 10/2003 | Garrod | |
| 6,645,073 | B2 | 11/2003 | Lemay et al. | |
| 6,645,077 | B2 | 11/2003 | Rowe | |
| 6,648,759 | B2 | 11/2003 | Vancura | |
| 6,648,762 | B2 | 11/2003 | Walker et al. | |
| 6,652,378 | B2 | 11/2003 | Cannon et al. | |
| 6,656,040 | B1 | 12/2003 | Brosnan et al. | |
| 6,656,043 | B2 | 12/2003 | Seelig et al. | |
| 6,656,047 | B1 | 12/2003 | Tarantino et al. | |
| 6,656,048 | B2 | 12/2003 | Olsen | |
| 6,656,052 | B2 | 12/2003 | Abramopoulos et al. | |
| 6,659,864 | B2 | 12/2003 | McGahn et al. | |
| 6,666,765 | B2 | 12/2003 | Vancura | |
| 6,672,959 | B2 | 1/2004 | Moody et al. | |
| 6,675,152 | B1 | 1/2004 | Prasad et al. | |
| 6,676,513 | B2 | 1/2004 | Gauselmann | |
| 6,682,419 | B2 | 1/2004 | Webb et al. | |
| 6,682,420 | B2 | 1/2004 | Webb et al. | |
| 6,688,977 | B1 | 2/2004 | Baerlocher et al. | |
| 6,692,355 | B2 | 2/2004 | Baerlocher et al. | |
| 6,712,694 | B1 | 3/2004 | Nordman | |
| 6,712,695 | B2 | 3/2004 | Mothwurf et al. | |
| 6,712,697 | B2 | 3/2004 | Acres | |
| 6,715,756 | B2 | 4/2004 | Inoue | |
| 6,719,630 | B1 | 4/2004 | Seelig et al. | |
| 6,726,204 | B2 | 4/2004 | Inoue | |
| 6,726,563 | B1 | 4/2004 | Baerlocher et al. | |
| 6,733,390 | B2 | 5/2004 | Walker et al. | |
| 6,746,328 | B2 | 6/2004 | Cannon et al. | |
| 6,749,504 | B2 | 6/2004 | Hughs-Baird | |
| 6,749,510 | B2 | 6/2004 | Giobbi | |
| 6,754,346 | B2 | 6/2004 | Eiserling et al. | |
| 6,761,632 | B2 | 7/2004 | Bansemer et al. | |
| 6,776,714 | B2 | 8/2004 | Ungaro et al. | |
| 6,776,715 | B2 | 8/2004 | Price | |
| 6,790,141 | B2 | 9/2004 | Muir | |
| 6,800,030 | B2 | 10/2004 | Acres | |
| 6,805,352 | B2 | 10/2004 | Hunter | |
| 6,811,483 | B1 | 11/2004 | Webb et al. | |
| 6,832,956 | B1 | 12/2004 | Boyd et al. | |
| 6,832,958 | B2 | 12/2004 | Acres et al. | |
| 6,837,788 | B2 | 1/2005 | Cannon | |
| 6,857,958 | B2 | 2/2005 | Osawa | |
| 6,866,583 | B2 | 3/2005 | Glavich et al. | |
| 6,869,361 | B2 | 3/2005 | Sharpless et al. | |
| 6,884,168 | B2 | 4/2005 | Wood et al. | |
| 6,887,154 | B1 | 5/2005 | Luciano, Jr. et al. | |
| 6,889,849 | B2 | 5/2005 | Heidel et al. | |
| 6,899,625 | B2 | 5/2005 | Luciano, Jr. et al. | |
| 6,905,406 | B2 | 6/2005 | Kaminkow et al. | |
| 6,908,387 | B2 | 6/2005 | Hedrick et al. | |
| 6,910,964 | B2 | 6/2005 | Acres | |
| 6,913,532 | B2 | 7/2005 | Baerlocher et al. | |
| 6,918,832 | B2 | 7/2005 | Baerlocher et al. | |
| 6,918,834 | B2 | 7/2005 | Vancura | |
| 6,935,951 | B2 | 8/2005 | Paulsen et al. | |
| 6,935,958 | B2 | 8/2005 | Nelson | |
| 6,939,234 | B2 | 9/2005 | Beatty | |
| 6,942,574 | B1 | 9/2005 | LeMay et al. | |
| RE38,812 | E | 10/2005 | Acres et al. | |
| 6,955,600 | B2 | 10/2005 | Glavich et al. | |
| 6,966,834 | B1 | 11/2005 | Johnson | |
| 7,004,466 | B2 | 2/2006 | Gauselmann | |
| 7,029,395 | B1 | 4/2006 | Baerlocher | |
| 7,036,012 | B2 | 4/2006 | Charrin | |
| 7,056,215 | B1 | 6/2006 | Olive | |
| 7,169,042 | B2 | 1/2007 | Muir et al. | |
| 7,578,739 | B2 * | 8/2009 | Gauselmann | 463/27 |
| 7,666,093 | B2 * | 2/2010 | Lafky et al. | 463/26 |
| 7,780,520 | B2 * | 8/2010 | Baerlocher | 463/25 |
| 7,959,509 | B2 * | 6/2011 | Saffari et al. | 463/27 |
| 8,162,666 | B2 * | 4/2012 | Parham | 434/42 |
| 2001/0024971 | A1 | 9/2001 | Brossard | |
| 2001/0049303 | A1 | 12/2001 | Found | |
| 2001/0055990 | A1 | 12/2001 | Acres | |
| 2002/0002674 | A1 | 1/2002 | Grimes et al. | |
| 2002/0042296 | A1 | 4/2002 | Walker et al. | |
| 2002/0045472 | A1 | 4/2002 | Adams | |
| 2002/0045475 | A1 | 4/2002 | Glavich et al. | |
| 2002/0071557 | A1 | 6/2002 | Nguyen | |
| 2002/0094855 | A1 | 7/2002 | Berman | |
| 2002/0094862 | A1 | 7/2002 | Inoue | |
| 2002/0116615 | A1 | 8/2002 | Nguyen et al. | |
| 2002/0138594 | A1 | 9/2002 | Rowe | |
| 2002/0142822 | A1 | 10/2002 | Baerlocher et al. | |
| 2002/0142829 | A1 | 10/2002 | Inoue | |
| 2002/0151345 | A1 | 10/2002 | Byrne | |
| 2002/0151354 | A1 | 10/2002 | Boesen et al. | |
| 2002/0152120 | A1 | 10/2002 | Howington | |
| 2002/0155874 | A1 | 10/2002 | Byrne | |
| 2002/0155880 | A1 | 10/2002 | Glavich et al. | |
| 2002/0165023 | A1 | 11/2002 | Brosnan et al. | |
| 2002/0187834 | A1 | 12/2002 | Rowe et al. | |
| 2002/0198036 | A1 | 12/2002 | Baerlocher et al. | |
| 2003/0014370 | A1 | 1/2003 | Charrin | |
| 2003/0024297 | A1 | 2/2003 | McMurtry | |
| 2003/0027618 | A1 | 2/2003 | Byrne | |
| 2003/0027625 | A1 | 2/2003 | Rowe | |
| 2003/0027630 | A1 | 2/2003 | Kelly et al. | |
| 2003/0036430 | A1 | 2/2003 | Cannon | |
| 2003/0040355 | A1 | 2/2003 | Baerlocher | |
| 2003/0040358 | A1 | 2/2003 | Rothkranz et al. | |
| 2003/0040360 | A1 | 2/2003 | Kaminkow | |
| 2003/0045337 | A1 | 3/2003 | Byrne | |
| 2003/0045348 | A1 | 3/2003 | Palmer et al. | |
| 2003/0045350 | A1 | 3/2003 | Baerlocher et al. | |
| 2003/0045353 | A1 | 3/2003 | Paulsen et al. | |
| 2003/0050106 | A1 | 3/2003 | Lyfoung | |
| 2003/0050111 | A1 | 3/2003 | Saffari | |
| 2003/0054875 | A1 | 3/2003 | Marks et al. | |
| 2003/0054878 | A1 | 3/2003 | Benoy et al. | |
| 2003/0060254 | A1 | 3/2003 | Cuddy et al. | |
| 2003/0060266 | A1 | 3/2003 | Baerlocher | |
| 2003/0060267 | A1 | 3/2003 | Glavich et al. | |
| 2003/0060269 | A1 | 3/2003 | Paulsen et al. | |
| 2003/0060272 | A1 | 3/2003 | Glavich et al. | |
| 2003/0060279 | A1 | 3/2003 | Torango | |
| 2003/0064772 | A1 | 4/2003 | Tempest et al. | |
| 2003/0064773 | A1 | 4/2003 | Baerlocher et al. | |
| 2003/0064776 | A1 | 4/2003 | Byrne | |
| 2003/0064785 | A1 | 4/2003 | Stone et al. | |
| 2003/0064790 | A1 | 4/2003 | Hughs-Baird et al. | |
| 2003/0069056 | A1 | 4/2003 | Cormack et al. | |
| 2003/0069064 | A1 | 4/2003 | Ainsworth | |
| 2003/0073482 | A1 | 4/2003 | Baerlocher et al. | |
| 2003/0078089 | A1 | 4/2003 | Gary et al. | |
| 2003/0083943 | A1 | 5/2003 | Adams et al. | |
| 2003/0092484 | A1 | 5/2003 | Schneider et al. | |
| 2003/0109306 | A1 | 6/2003 | Karmarkar | |
| 2003/0119583 | A1 | 6/2003 | Kaminkow et al. | |
| 2003/0144965 | A1 | 7/2003 | Prasad et al. | |
| 2003/0146574 | A1 | 8/2003 | Duhamel | |
| 2003/0148808 | A1 | 8/2003 | Price | |
| 2003/0162584 | A1 | 8/2003 | Hughs-Baird et al. | |
| 2003/0162585 | A1 | 8/2003 | Bigelow et al. | |
| 2003/0181231 | A1 | 9/2003 | Vancura et al. | |
| 2003/0182574 | A1 | 9/2003 | Whitten et al. | |
| 2003/0186733 | A1 | 10/2003 | Wolf et al. | |
| 2003/0195027 | A1 | 10/2003 | Baerlocher et al. | |
| 2003/0199321 | A1 | 10/2003 | Williams | |
| 2003/0207709 | A1 | 11/2003 | Paotrakul | |
| 2003/0207710 | A1 | 11/2003 | Rodgers et al. | |
| 2003/0211879 | A1 | 11/2003 | Englman | |
| 2003/0211884 | A1 | 11/2003 | Gauselmann | |
| 2003/0216165 | A1 * | 11/2003 | Singer et al. | 463/20 |
| 2003/0216166 | A1 | 11/2003 | Baerlocher et al. | |
| 2003/0222402 | A1 | 12/2003 | Olive | |
| 2003/0223803 | A1 | 12/2003 | De Schrijver | |
| 2003/0228899 | A1 | 12/2003 | Evans | |

| | | | |
|---|---|---|---|
| 2003/0228904 | A1 | 12/2003 | Acres et al. |
| 2003/0232643 | A1 | 12/2003 | Inoue |
| 2003/0232647 | A1 | 12/2003 | Moser |
| 2003/0236116 | A1 | 12/2003 | Marks et al. |
| 2004/0000754 | A1 | 1/2004 | Inoue |
| 2004/0002372 | A1 | 1/2004 | Rodgers et al. |
| 2004/0009807 | A1 | 1/2004 | Miller et al. |
| 2004/0009808 | A1 | 1/2004 | Gauselmann |
| 2004/0009811 | A1 | 1/2004 | Torango |
| 2004/0012145 | A1 | 1/2004 | Inoue |
| 2004/0014516 | A1 | 1/2004 | Inoue |
| 2004/0014517 | A1 | 1/2004 | Inoue |
| 2004/0017041 | A1 | 1/2004 | Inoue |
| 2004/0018866 | A1 | 1/2004 | Inoue |
| 2004/0023716 | A1 | 2/2004 | Gauselmann |
| 2004/0026854 | A1 | 2/2004 | Inoue |
| 2004/0029631 | A1 | 2/2004 | Duhamel |
| 2004/0036218 | A1 | 2/2004 | Inoue |
| 2004/0038726 | A1 | 2/2004 | Inoue |
| 2004/0038741 | A1 | 2/2004 | Gauselmann |
| 2004/0041340 | A1 | 3/2004 | Inoue |
| 2004/0048644 | A1 | 3/2004 | Gerrard et al. |
| 2004/0048649 | A1 | 3/2004 | Peterson et al. |
| 2004/0048652 | A1 | 3/2004 | Ching et al. |
| 2004/0053658 | A1 | 3/2004 | Rothranz |
| 2004/0053659 | A1 | 3/2004 | Rothkranz et al. |
| 2004/0053670 | A1 | 3/2004 | Rothkranz et al. |
| 2004/0053671 | A1 | 3/2004 | Nordman |
| 2004/0053672 | A1 | 3/2004 | Baerlocher |
| 2004/0053673 | A1 | 3/2004 | Mishra |
| 2004/0053683 | A1 | 3/2004 | Hartl et al. |
| 2004/0053687 | A1 | 3/2004 | Nordman et al. |
| 2004/0072615 | A1 | 4/2004 | Maya et al. |
| 2004/0072619 | A1 | 4/2004 | Brosnan et al. |
| 2004/0087368 | A1 | 5/2004 | Gauselmann |
| 2004/0092304 | A1 | 5/2004 | George |
| 2004/0121840 | A1 | 6/2004 | Rosander et al. |
| 2004/0137982 | A1 | 7/2004 | Cuddy et al. |
| 2004/0147306 | A1 | 7/2004 | Randall et al. |
| 2004/0150161 | A1 | 8/2004 | Inoue |
| 2004/0152509 | A1 | 8/2004 | Hornik et al. |
| 2004/0155399 | A1 | 8/2004 | Inoue |
| 2004/0157658 | A1 | 8/2004 | Rothkranz |
| 2004/0171416 | A1 | 9/2004 | Baerlocher et al. |
| 2004/0171420 | A1 | 9/2004 | Baerlocher et al. |
| 2004/0180715 | A1 | 9/2004 | Nordman |
| 2004/0183251 | A1 | 9/2004 | Inoue |
| 2004/0235552 | A1 | 11/2004 | Gauselmann |
| 2004/0242297 | A1 | 12/2004 | Walker |
| 2005/0003880 | A1 | 1/2005 | Englman |
| 2005/0026694 | A1 | 2/2005 | Kelly et al. |
| 2005/0032573 | A1 | 2/2005 | Acres et al. |
| 2005/0053672 | A1 | 3/2005 | West |
| 2005/0054429 | A1 | 3/2005 | Baerlocher et al. |
| 2005/0055113 | A1 | 3/2005 | Gauselmann |
| 2005/0059467 | A1 | 3/2005 | Saffari et al. |
| 2005/0059472 | A1 | 3/2005 | Joshi et al. |
| 2005/0064930 | A1 | 3/2005 | Jubinville et al. |
| 2005/0070356 | A1 | 3/2005 | Mothwurf |
| 2005/0075163 | A1 | 4/2005 | Cuddy et al. |
| 2005/0079908 | A1 | 4/2005 | Pacey |
| 2005/0079911 | A1 | 4/2005 | Nakatsu |
| 2005/0086478 | A1 | 4/2005 | Pienado et al. |
| 2005/0090307 | A1 | 4/2005 | Walker et al. |
| 2005/0096130 | A1 | 5/2005 | Mullins |
| 2005/0101374 | A1 | 5/2005 | Acres |
| 2005/0101375 | A1 | 5/2005 | Webb et al. |
| 2005/0101384 | A1 | 5/2005 | Parham |
| 2005/0119047 | A1 | 6/2005 | Olive |
| 2005/0137010 | A1 | 6/2005 | Enzminger et al. |
| 2005/0143168 | A1 | 6/2005 | Torango |
| 2005/0143169 | A1 | 6/2005 | Nguyen et al. |
| 2005/0159211 | A1 | 7/2005 | Englman |
| 2005/0163377 | A1 | 7/2005 | Walch |
| 2005/0176488 | A1 | 8/2005 | Olive |
| 2005/0178716 | A1 | 8/2005 | Suri |
| 2005/0192083 | A1 | 9/2005 | Iwamoto |
| 2005/0192088 | A1 | 9/2005 | Hartman et al. |
| 2005/0192099 | A1 | 9/2005 | Nguyen et al. |
| 2005/0197180 | A1 | 9/2005 | Kaminkow et al. |
| 2005/0209004 | A1 | 9/2005 | Torango |
| 2005/0215313 | A1 | 9/2005 | O'Halloran |
| 2005/0227754 | A1 | 10/2005 | Kaminkow et al. |
| 2005/0239542 | A1 | 10/2005 | Olsen |
| 2005/0267610 | A1 | 12/2005 | Shinoda |
| 2005/0282626 | A1 | 12/2005 | Manfredi et al. |
| 2006/0003829 | A1 | 1/2006 | Thomas |
| 2006/0009285 | A1 | 1/2006 | Pryzby et al. |
| 2006/0019737 | A1 | 1/2006 | Yang |
| 2006/0025195 | A1 | 2/2006 | Pennington et al. |
| 2006/0025201 | A1 | 2/2006 | Van Asdale |
| 2006/0025210 | A1 | 2/2006 | Johnson |
| 2006/0026604 | A1 | 2/2006 | Tan et al. |
| 2006/0030397 | A1 | 2/2006 | Chan |
| 2006/0030403 | A1 | 2/2006 | Lafky et al. |
| 2006/0035694 | A1 | 2/2006 | Fuller |
| 2006/0035706 | A1 | 2/2006 | Thomas et al. |
| 2006/0036552 | A1 | 2/2006 | Gunyakti et al. |
| 2006/0040732 | A1 | 2/2006 | Baerlocher et al. |
| 2006/0040736 | A1 | 2/2006 | Baerlocher et al. |
| 2006/0052159 | A1 | 3/2006 | Cahill et al. |
| 2006/0052161 | A1 | 3/2006 | Soukup et al. |
| 2006/0052162 | A1 | 3/2006 | Soukup et al. |
| 2006/0068897 | A1 | 3/2006 | Sanford et al. |
| 2006/0073877 | A1 | 4/2006 | Rodgers et al. |
| 2006/0073889 | A1 | 4/2006 | Edidin et al. |
| 2006/0073897 | A1 | 4/2006 | Englman et al. |
| 2006/0116201 | A1 | 6/2006 | Gauselmann |
| 2006/0142079 | A1 | 6/2006 | Ikehara et al. |
| 2006/0142086 | A1 | 6/2006 | Blackburn et al. |
| 2006/0154718 | A1 | 7/2006 | Willyard et al. |
| 2006/0178203 | A1 | 8/2006 | Hughes et al. |
| 2006/0183535 | A1 | 8/2006 | Marks et al. |
| 2006/0183537 | A1 | 8/2006 | Dickerson |
| 2006/0183538 | A1 | 8/2006 | Michaelson et al. |
| 2006/0281527 | A1 | 12/2006 | Dunaevsky et al. |
| 2006/0287077 | A1 | 12/2006 | Grav et al. |
| 2007/0026941 | A1 | 2/2007 | Block et al. |
| 2007/0060271 | A1 | 3/2007 | Cregan et al. |
| 2007/0060319 | A1 | 3/2007 | Block et al. |
| 2007/0117610 | A1 | 5/2007 | Webb et al. |
| 2007/0202943 | A1 | 8/2007 | Thomas |
| 2007/0298875 | A1 | 12/2007 | Baerlocher et al. |

FOREIGN PATENT DOCUMENTS

| | | | |
|---|---|---|---|
| AU | 567001 | | 11/1987 |
| AU | 585160 | | 6/1989 |
| AU | 589158 | | 10/1989 |
| AU | 593059 | | 2/1990 |
| AU | 630112 | | 3/1990 |
| AU | 628330 | | 9/1992 |
| AU | 633469 | | 1/1993 |
| AU | 649009 | | 5/1994 |
| AU | 655801 | | 1/1995 |
| AU | 1996 70247 | | 4/1997 |
| AU | 680920 | | 8/1997 |
| AU | 710015 | | 9/1997 |
| AU | 766312 | | 10/1997 |
| AU | 722969 | | 6/1998 |
| AU | 1998 63553 | A | 10/1998 |
| AU | 1998 84162 | | 3/1999 |
| AU | 707687 | | 7/1999 |
| AU | 1999 17318 | | 9/1999 |
| AU | 709724 | | 9/1999 |
| AU | 711501 | | 10/1999 |
| AU | 716299 | | 2/2000 |
| AU | 721968 | | 7/2000 |
| AU | 722107 | | 7/2000 |
| AU | 728788 | | 1/2001 |
| AU | 2001 1000032 | | 11/2001 |
| AU | 2001 1000033 | | 11/2001 |
| AU | 748263 | | 5/2002 |
| AU | 749222 | | 6/2002 |
| AU | 754689 | | 11/2002 |
| AU | 758306 | | 3/2003 |
| AU | 1999 43453 | C | 4/2003 |
| CA | 2 334 546 | | 8/2001 |
| DE | 3415114 | | 11/1985 |

| | | | |
|---|---|---|---|
| DE | 8710757 | | 11/1987 |
| DE | 3700861 | | 7/1988 |
| DE | 3638100 | | 11/1988 |
| DE | 3915655 | | 11/1990 |
| DE | 3917683 | | 12/1990 |
| DE | 4200254 | | 8/1993 |
| DE | 4301855 | | 7/1994 |
| DE | 195 15 983 | | 11/1996 |
| DE | 19600787 | C2 | 5/1997 |
| DE | 19613455 | C2 | 8/1997 |
| DE | 19936196 | A1 | 1/2001 |
| DE | 3700861 | A1 | 8/2004 |
| EP | 0 342 797 | | 11/1989 |
| EP | 0 444 932 | | 2/1991 |
| EP | 0 449 433 | A2 | 10/1991 |
| EP | 0 521 599 | | 1/1993 |
| EP | 0 798 676 | A1 | 10/1997 |
| EP | 0 874 337 | A1 | 10/1998 |
| EP | 0 926 645 | A2 | 6/1999 |
| EP | 0 944 030 | A2 | 9/1999 |
| EP | 0 945 837 | A2 | 9/1999 |
| EP | 0 981 119 | A2 | 2/2000 |
| EP | 0 984 408 | A2 | 3/2000 |
| EP | 0 984 409 | A2 | 3/2000 |
| EP | 1 003 138 | A2 | 5/2000 |
| EP | 1 467 329 | A2 | 10/2004 |
| EP | 1 498 860 | A1 | 1/2005 |
| EP | 1 513 114 | A2 | 3/2005 |
| EP | 1 528 516 | A2 | 5/2005 |
| EP | 1 528 517 | A2 | 5/2005 |
| GB | 912 685 | | 12/1962 |
| GB | 2 083 936 | A | 3/1982 |
| GB | 2 096 376 | A | 10/1982 |
| GB | 2 097 160 | A | 10/1982 |
| GB | 2 100 905 | A | 1/1983 |
| GB | 2 117 155 | A | 10/1983 |
| GB | 2 117 952 | A | 10/1983 |
| GB | 2 118 445 | | 11/1983 |
| GB | 2 144 644 | A | 3/1984 |
| GB | 2 137 392 | A | 10/1984 |
| GB | 2 139 390 | | 11/1984 |
| GB | 2 142 457 | A | 1/1985 |
| GB | 2 147 773 | | 5/1985 |
| GB | 2 148 135 | | 5/1985 |
| GB | 2 151 054 | A | 7/1985 |
| GB | 2 153 572 | A | 8/1985 |
| GB | 2 161 008 | A | 1/1986 |
| GB | 2 161 009 | A | 1/1986 |
| GB | 2 170 636 | A | 8/1986 |
| GB | 2 180 682 | A | 4/1987 |
| GB | 2 181 589 | A | 4/1987 |
| GB | 2 183 882 | A | 6/1987 |
| GB | 2 201 821 | A | 9/1987 |
| GB | 2 191 030 | A | 12/1987 |
| GB | 2 222 712 | A | 3/1990 |
| GB | 2 226 436 | A | 6/1990 |
| GB | 2 226 907 | A | 7/1990 |
| GB | 2 231 189 | | 11/1990 |
| GB | 2 242 300 | | 9/1991 |
| GB | 2 282 690 | | 4/1995 |
| GB | 2 313 792 | | 10/1997 |
| GB | 2 322 217 | A | 8/1998 |
| GB | 2 333 880 | A | 9/1998 |
| GB | 2 328 311 | | 2/1999 |
| GB | 2 353 128 | A | 2/2001 |
| GB | 2 383 668 | A | 11/2001 |
| GB | 2 387 703 | | 10/2003 |
| JP | 7148307 | | 6/1995 |
| JP | 2002-320703 | | 11/2002 |
| WO | WO 94/12256 | | 6/1994 |
| WO | WO 95/22811 | | 8/1995 |
| WO | WO 95/30944 | | 11/1995 |
| WO | WO 97/12338 | | 4/1997 |
| WO | WO 97/27568 | | 7/1997 |
| WO | WO 97/32285 | | 9/1997 |
| WO | WO 98/35309 | | 8/1998 |
| WO | WO 98/47115 | | 10/1998 |
| WO | WO 98/51384 | | 11/1998 |
| WO | WO 99/03078 | | 1/1999 |
| WO | WO 99/10849 | | 3/1999 |
| WO | WO 00/12186 | | 3/2000 |
| WO | WO 00/32286 | | 6/2000 |
| WO | WO 00/66235 | | 11/2000 |
| WO | WO 00/76606 | | 12/2000 |
| WO | WO 01/10523 | | 2/2001 |
| WO | WO 01/15055 | | 3/2001 |
| WO | WO 01/15790 | | 3/2001 |
| WO | WO 01/26019 | | 4/2001 |
| WO | WO 01/33478 | | 5/2001 |
| WO | WO 02/07836 | | 1/2002 |
| WO | WO 03/026754 | | 4/2003 |
| WO | WO 03/030066 | | 4/2003 |
| WO | WO 03/075235 | | 9/2003 |
| WO | WO 03/083789 | | 10/2003 |
| WO | WO 2004/035161 | | 4/2004 |
| WO | WO 2004/066061 | | 8/2004 |
| WO | WO 2005/027058 | | 3/2005 |
| WO | WO 2005/076193 | | 8/2005 |
| WO | WO 2005/081623 | | 9/2005 |
| WO | WO 2005/083599 | | 9/2005 |
| WO | WO 2005/099425 | | 10/2005 |
| WO | WO 2005/099845 | | 10/2005 |
| WO | WO 2005/106702 | | 11/2005 |
| WO | WO 2005/113093 | | 12/2005 |
| WO | WO 2006/014770 | | 2/2006 |
| WO | WO 2006/014883 | | 2/2006 |
| WO | WO 2006/014990 | | 2/2006 |
| WO | WO 2006/039366 | | 4/2006 |

OTHER PUBLICATIONS

American Bandstand Article written by in Strictly Slots, published in 2002.

American Bandstand Brochure written by Anchor Games, published in 2001.

Aristrocrat Brochure, written by Aristocrat Gaming, published in 2004.

Atronic Systems Progressive Products at G2E, published by Atronic in 2004, printed from ForRelease.com.

Austin Powers in Goldmember™ Advertisement written by IGT, published in 2003.

Bally Slot Machines Electro-Mechanicals 1964-1980 Book [In Part], Revised 3rd Edition written by Marshall Fey.

Big Shot!™ Advertisement published by Aristocrat Technologies, Inc., published in 2002.

Big Top Keno Advertisement published by Aristocrat Technologies, Inc., published in 2000.

Bingo Game Brochure written by Casino Data System, published in 1998.

Bonus Roulette Brochure written by F. Franco, published prior to Sep. 2003.

Buck's Roulette Brochure written by R. Franco, published prior to Sep. 2003.

Cartoon Jackpots description, printed from www.ballygaming.com/home.asp, on Feb. 4, 2005.

Cash Express Advertisements, written by Aristocrat, published in 2002.

Cashing In Article, written by Frank Legato, published in Strictly Slots Aug. 2006.

Chariot's of Fortune Brochure written by R. Franco, published prior to Sep. 2003.

Classic Pot of Gold Brochure written by Ace Coin Equipment Ltd., published prior to Sep. 2003.

Crazy Fruits Article written by Strictly Slots, published in Apr. 2001.

Cyberdyne Gaming Brochure written by Cyberdyne Gaming, published prior to Sep. 11, 2003.

Double Diamond Girls Advertisement, written by A.C. Coin and Slot Services Company, published prior to Sep. 11, 2003.

Double Spin Five Times Pay Advertisement, written by IGT, published prior to 2000.

Double up Poker Game Description written by IGT, available prior to Sep. 2000.

Easy Riches Article, written by Strictly Slots, published in Aug. 2001.

Elvira® Mistress of the Dark™ Advertisement written by IGT, published in 2002.
Elvis Hits Advertisement written by IGT, published in 1999.
FAST BUCK Systems Manual, written by International Game Technology, available to Mirage shift supervisors at least as early as May 30, 1990.
Fortune Cookie Brochure written by IGT, published in 2000.
Full House Brochure written by Anchor Games, published in 2000.
Gold Fever Advertisement, written by Atronic International Casino, published in 1999.
Gold Fever Advertisement, written by Casino Data Systems, published in 1997.
High Low Card Game written by Qeocities.com, printed May 3, 2001.
High Roller Video Article, written by Frank Legato, published in Strictly Slots Mar. 2001.
Holy Smoke Brochure written by Impulse Gaming Ltd., published prior to Sep. 2003.
Honeymooners Advertisement, written by AC Coin & Slot, published in 2002.
Hot Shot Progressive Article, written by Strictly Slots, published in Feb. 2006.
In Between Game Description written by IGT, available prior to Sep. 2000.
Jack and the Beanstalk™ Article written by Strictly Slots, published Jul. 2002.
Jackpot Bingo, [online] [printed on Apr. 12, 2001]. Retrieved from the Internet at <URL:http://www.csds.com/gaming/g-progressiv.htm>.
Jackpot Carnival Hyperlink Advertisement, written by Aristocrat, published prior to 2002.
Jackpot Hotline Advertisement, written by AC Coin and Slot, published prior to Sep. 2003.
Jackpot Hunter Advertisement, written by IGT, available prior to Jan. 2005.
Jewel in the Crown Advertisement, written by IGT, published in 1999.
Jewel in the Crown Brochure written by Barcrest, Ltd, published prior to 2000.
King of the Grill™ Brochure written by AC Coin & Slot, published prior to Sep. 2003.
Lemons, Cherries and Bell-Fruit-Gum written by Richard M. Bueschel, pp. 1-4, 39-41, 64, 70, 137, 149-150, 195-196 and 251, 304-314, published Nov. 1995.
Line-Up Brochure written by AC Coin & Slot, published prior to Sep. 2003.
Little Green Men Jr.™ Advertisement written by AC Coin & Slot, published prior to Sep. 11, 2003.
Little Green Men Jr.™ Article written by Strictly Slots, published in Feb. 2003.
Magic 8 Ball Advertisement written by IGT, published in 2002.
Match Reel Game Bonus Description, written by IGT, published prior to 2000.
Mikohn Product Catalog, Chapters 1, 2, 6, 7 and 8, written by Mikohn, published in Jan. 1993.
Mikohn Ripley's Believe It or Not Article written by Strictly Slots published in 2001.
Mikohn Super Controller Manual, Chapters 1 to 3 and 6 to 7, written by Mikohn, published in 1989.
Millioniser Article, written by Strictly Slots, published in Mar. 2004.
Miss America Brochure written by AC Coin & Slot, published prior to Sep. 11, 2003.
Mix and Match Advertisement published by AC Coin & Slot, published prior to Sep. 2003.
Mix and Match Article written by Strictly Slots, published in Apr. 2002.
Money Grab Article written by Strictly Slots, published in Apr. 2001.
Money Time advertisement, written by Mikohn Gaming, published in 1999.
Money to Bum Brochure written by WMS Gaming, Inc., published prior to 2001.
Monster Match Article, published in Strictly Slots Jan. 2002.
Monte Carlo Advertisement written by Bally Gaming, published prior to Sep. 2002.
M-Slot Series Primary Reel Product description from Lemons, Cherries and Bell-Fruit-Gum, written by Richard M. Bueschel, published in 1995.
On The Money! Article written by Strictly Slots, published in Dec. 2000.
*Payout!™ Advertisement written by* www.csds.com/Gaming/Products_/g_Payout.htm, printed on Jan. 15, 2001.
Payout!™ Article written by Casino Data Systems, published prior to Sep. 2003.
PEM—Precision Electronic Meter, written by GRIPS Electronic GmbH, printed from website reported as archived on Feb. 20, 1997 (available at http://web.archive.org/web/19970220165753/www.grips.com/pem.htm).
Penguin Pucks article, written by Note in Gaming Marketplace, published prior to 2004.
Pick a Prize Brochure written by Acres Gaming Incorporated, published prior to 2001.
Player Tracking on Slots, written by GRIPS Electronic GmbH, printed from website reported as archived on Feb. 20, 1997 (available at http://web.archive.org/web/19970220165921/www.grips.com/playtrac.htm).
Plinko Showcase Show Down written by International Game Technology, published in 2001.
Power Slotto Brochure published by AC Coin & Slot prior to 2002.
Press Your Luck Brochure published by AC Coin & Slot prior to 2002.
Progressive Jackpot System article, printed from casinomagazine.com.managearticle.asp@c_290&a=518, on Jun. 21, 2004.
ProLINK Progressive Controller User/Reference Manual, written by Casino Data Systems, published in Apr. 1997.
Quick Pick Paytime Brochure written by Acres Gaming Incorporated, published prior to 2001.
R&B™ Brochure published by AC Coin & Slot, published prior to Sep. 2003.
Reel Dice Advertisement written by Gerber & Glass, published in 1936.
Royal Roulette Brochure written by Impulse Gaming Ltd., published prior to Sep. 2003.
Run For Your Money Game Description written by Barcrest, published prior to 2001.
Scarne, Scarne's Encyclopedia of Card Games, 1973, HarperCollins Publishers, Inc., 278-279.
Scame's New Complete Guide to Gambling (© 1997)—John Scarne, pp. 162-167.
Silver City Roundup Brochure published by AC Coin & Slot, published prior to Sep. 2003.
Slot Line Progressive Advertisement, written by IGT, published in 1993.
Slot Line Progressive Advertisement, written by IGT, published in 1994.
Slot Line Progressive Advertisement, written by IGT, published in 1995.
Slot Line Progressive Mega Jackpots Advertisement, written by IGT, published in 1997.
Slot Line Temperature Rising Game Description, written by IGT, published in 1998.
Slot Machine Buyer's Handbook, A Consumer's Guide to Slot Machines written by David L. Saul and Daniel R. Mead, published in 1998.
Slot Machines A Pictorial History of the First 100 Years (pp. 216, 242 to 243), 5th edition, written by Marshall Fey, published in 1983-1997.
Slot Machines and Coin-Op Games written by Bill Kurtz, pp. 16, 65, 105 and 111, 1991.
Slot Machines on Parade, 1st edition written by Robert N. Geddes and illustrated by Daniel R. Mead, published in 1980.
Sphinx Brochure written by Atropic Casino Technology, Ltd., published in 1997.
Spin Til You Win Information Sheet written by IGT, published in 1996.
Spin-A-Lot Brochure written by Acres Gaming Incorporated, published prior to 2001.

Super Cherry Advertisement written by IGT in 2001.
Surprize Gaming Machine Advertisement, written by Aristocrat Leisure Industries, Australia, published prior to 2004.
Surprize Software Specification for MV2030—var 01, written by Aristocrat Leisure Industries, Australia, published prior to 2004.
Take Your Pick Article written by Strictly Slots, published in Mar. 2001.
Take Your Pick Brochure and Article written by IGT/Anchor Games, Strictly Slots, published in 1999.
Texas Tea [online], [printed on Mar. 21, 2001]. Retrieved from the Internet at <URL: http://www.igt.com/games/new_games/texastea.html>.
Texas Tea Advertisement, written by IGT, published in 2000.
Texas Tea Article written by Strictly Slots, published in Jul. 2000.
Top Dollar Brochure written by IGT, published in 1998.
Wheel & Deal Brochure written by Strictly Slots, published in Dec. 2001.
Wheel of Fortune Advertisement written by IGT, published in 1998.
Wheel Poker Article, written by Strictly Slots, published prior to 2002.
Wide Area Progressive Link System, written by GRIPS Electronic GmbH, printed from website reported as archived on Feb. 20, 1997 (available at http://web.archive.org/web/19970220165457/www.grips.com/wap.htm).
Yahtzee Bonus Advertisement written by Mikohn, published in 1999.
Zorro Advertisement, written by Aristocrat, published in 2004.

* cited by examiner

GAMING METHOD AND DEVICE INVOLVING PROGRESSIVE WAGERS

PRIORITY CLAIM

This application is a divisional of, claims priority to and the benefit of U.S. patent application Ser. No. 11/196,645, filed on Aug. 2, 2005, which is a non-provisional application of, claims priority to and the benefit of U.S. Provisional Patent Application Ser. No. 60/598,305, filed on Aug. 3, 2004, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD OF THE INVENTION

The embodiments of the present invention relate to casino wagering games with one or more progressive awards that increase in value based on a random event, or other pre-established event or outcome, and/or reset if not won during a bonus event.

BACKGROUND

A number of wagering games feature awards which increase in value over time. Such awards are known as progressive awards. Typically progressive awards begin at a specific value known as a seed value or reset value and then increase over time based upon the number of eligible placed wagers. Usually, progressive awards increase by utilizing a specified fraction of each eligible placed wager. The phrase "eligible wager" refers to a pre-established wager amount, typically the maximum possible wager, required for a progressive award to be won. Furthermore, some gaming jurisdictions mandate that only wagers which can result in a progressive award can be used to fund progressive award increases.

A common progressive award works as follows: When the game is first offered, or after the prior progressive award is won, the progressive award value is set to a specific value. Thereafter, a set percentage of each eligible wager is added to the progressive award value until a game outcome occurs resulting in a player winning the progressive award.

A progressive award can involve wagers and play from a single machine or a number of machines. In the latter case, known as linked progressives, machines are configured in a bank of adjacent machines, or a plurality of machines across multiple banks within a casino, or across a plurality of casinos within a regional geographic area or across a plurality casinos across a plurality of regional geographic areas. In many games with progressive awards, especially with linked progressive awards, increases in the progressive award are cached such that the award value may be displayed as continuously and smoothly increasing rather than jumping up in rapid, varied amounts. The progressive award is often displayed in a manner reminiscent of a car odometer to better give the impression of continual and smooth jackpot growth.

One notable exception to the common practice of increasing a progressive award for each eligible wager is evident in Silicon Gaming's video poker game, "Phantom Belle Playoff", that offers a discrete progressive award increase of a certain size after a certain number of eligible wagers have been placed. In this case, the progressive award increases after a specific number of maximum wagers has been placed.

Most games with progressive awards are configured to pay the progressive award based upon a primary game outcome. For example, in a slot machine game, a progressive award is won in response to a certain set of symbols, typically the top-most symbol(s), aligned along a certain pay line when a maximum wager has been placed. However there are some slot games that pay a progressive award as the outcome of a bonus event. Another example relates to a card game wherein a certain hand outcome occurs, such as a royal flush outcome.

Many casino games offer bonus events or bonus rounds beyond the primary game. Such a bonus can be triggered in response to an outcome of the primary game. For example, in a slot machine game the outcome may be based on certain symbols appearing in a certain configuration. Other games can be offered whereby the bonus is triggered based on a secondary event. For example, in the video poker game, Phantom Belle Playoff, the appearance of a special card from the deck has no effect on the primary game but causes a bonus round to be launched.

In a bonus event, the player typically is awarded a prize based upon a secondary outcome selection different from the primary game outcome. In slot games, like "Wheel of Gold" or "Wheel of Fortune", for example, the bonus round is triggered when a bonus symbol appears in a pre-established manner (either on the pay line on the last reel or on all positions on the pay line, based upon the game definition) and the player has placed a maximum wager. During the bonus round, the player initiates the spinning of the bonus wheel. Eventually the wheel slows to a stop. The wheel is separated into segments, each depicting an award. The player wins the award depicted on the wheel segment identified by a single pointer at an edge of the wheel after the wheel stops.

A bonus event typically involves the following features:

- results in the player receiving an award;
- the actual award amount is often unknown to the player until bonus event is played;
- uses prize reveal and/or selection mechanisms beyond the main game outcome;
- player input is required to initiate the start of the bonus game;
- in some cases, a bonus event may require increased player interactivity such as the player identifying selection spots to reveal hidden symbols; and/or
- in some cases, a bonus event may involve actual player decisions such as whether to accept the current bonus award or forgo the same in lieu of the opportunity to seek a larger bonus award.

SUMMARY

One embodiment of the present invention comprises a method of conducting a wagering game, accepting a player wager, generating a game outcome, resolving the player wager by paying the player an award in response to the game outcome matching a predefined winning outcome, and in response to the game outcome matching a predefined outcome, increasing an associated progressive award value.

The embodiments of the present invention include a method and device for offering a casino game with one or more progressive awards with some or all of the following features:

the progressive award only increases based upon some primary or secondary game outcome;

for a non-linked progressive award corresponding to a game linked to a player tracking system, any progressive award gains follow the player between play sessions; and/or the progressive award can only be won during a bonus round and whether or not the bonus award is won, the bonus award is reset after the bonus game ends.

Thus, instead of increasing the progressive award for every eligible wager, the progressive jackpot only increases in response to a certain primary or secondary game outcome. Such a scheme increases player excitement and interest by making jackpot increases a special event instead of the standard routine, automatic event. The jackpot increase can become a psychological reward which does not have an immediate negative financial impact on the casino offering the game. The feature may also help encourage players to play a given game more often since the players may feel more directly responsible for the increased progressive awards based upon their actual play.

Examples of primary progressive award increase triggers include (but are not limited to):

appearance of certain symbol(s), perhaps in certain location(s), during play of a slot machine game;

appearance of certain card(s), perhaps in certain hand positions, during play of a card game;

the occurrence of certain defined winning outcomes; and/or the occurrence of a non-winning outcome, especially in a very high hit frequency game.

The most basic example of a secondary progressive award increase trigger is increasing the progressive award randomly and independent of the primary game outcome. In one example, it involves the display of a secondary gaming element such as a wheel or other display. Another secondary event example involves the use of a special feature reel in addition to standard game reels. Then, if a certain symbol appears on the special feature reel, perhaps in conjunction with certain primary game outcomes, it may trigger an increase of the progressive award.

As with standard games having progressive awards, a game may be configured to allow only progressive award increases when a certain betting requirement is met, for example, when a maximum wager is placed. Alternately, a game can be configured where all placed wagers are eligible.

When a progressive award is increased, there are a few methods to define the amount of the increase. A game can be configured to add the same amount for the same trigger. For games that allow for progressive award increases for a multiplicity of wager amounts, the award increase can be scaled based upon the actual wager amount. Another game definition can result in different types of progressive award increase triggers that result in different progressive award increase amounts. Another game definition can result in the progressive award increase being randomly selected, perhaps from a distribution of possible awards. Such variable progressive award increases can be part of a bonus round event. Another game definition can allow for different triggers that cause an increase in different progressive award values. Furthermore, different triggers can cause different increases in the progressive award value. Moreover, a game definition can allow for multiple simultaneous triggers, each of which causes a progressive award increase, possibly of the same progressive award and/or different progressive awards.

Another aspect of the embodiments of the present invention is the concept of a personal progressive award following a player. Specifically, some game devices allow for individual player tracking, usually initiated by having the player insert his or her unique player identification card into a card reader installed in the machine. Player tracking is also possible in games offered via the Internet wherein the player is required to provide a user ID and password in order to play. A gaming system that can provide player tracking can also be designed to maintain progressive awards between play sessions for the same player. For example, if a given player is able to increase his personal progressive award to a certain amount, the progressive award remains at the same value the next time the player returns to play the game.

Another aspect of the embodiments of the present invention is the concept that a progressive award can only be won during a bonus round, and if the progressive award is not won, the progressive award is reset. For example, when a player initially starts a game having such a feature, the progressive award is set at a certain level which can increase as the player plays, either through traditional progressive award growth mechanisms or through the random increase mechanism aspect of the embodiments of the present invention. The player can only win a progressive award during play of a bonus round. Whether or not the player wins such a progressive award, all such progressive awards are reset upon exiting the bonus round.

There are additional aspects of the embodiments of the present invention related to setting and adjusting the progressive award value based upon the wager amount. One such aspect involves selecting the progressive award reset value based upon the amount of the wager. For example, a progressive jackpot value can be reset to the value of S×W, where S is the base seed value and W is the relevant wager amount placed during the game play when the bonus game or round is activated. Alternatively, a progressive award boost can be applied if a wager in excess of a minimum wager is placed during the game play when the bonus game or round is activated. For example, the jackpot value may be reset to the value S, but if the player's wager W is greater than 1 unit, the jackpot value is increased by S×(W−1) at the start of the bonus round. In a more specific example, the progressive award is reset to 100 units. Then, if during play of the game, the progressive award value is increased by 60 units, with a 5 unit wager in place, and a game outcome triggers a bonus round or game, the progressive award of 160 units is boosted by 400 units calculated as follows: 100*(5−1)=400 units to a total progressive award value of 560 units which the player has the opportunity to win during the bonus round.

The above disclosed two jackpot adjustments can both be offered in the same game. Specifically, for a game linked to a player tracking system, the progressive award value is set to S for the first time that a given player plays the game. The first time said player enters the bonus round and the player's wager is greater than 1 unit, a boost of S×(W−1) is added to the progressive award value. The boost only occurs on the first bonus round event for said player. Upon exiting a bonus round the first time or any subsequent time, the progressive award value is reset to S×W.

All of the above described game features can also apply to game methods and devices which involve a plurality of progressive awards. Other variations, embodiments and features of the present invention will become evident from the following detailed description, drawings and claims.

DETAILED DESCRIPTION

Figure 1:
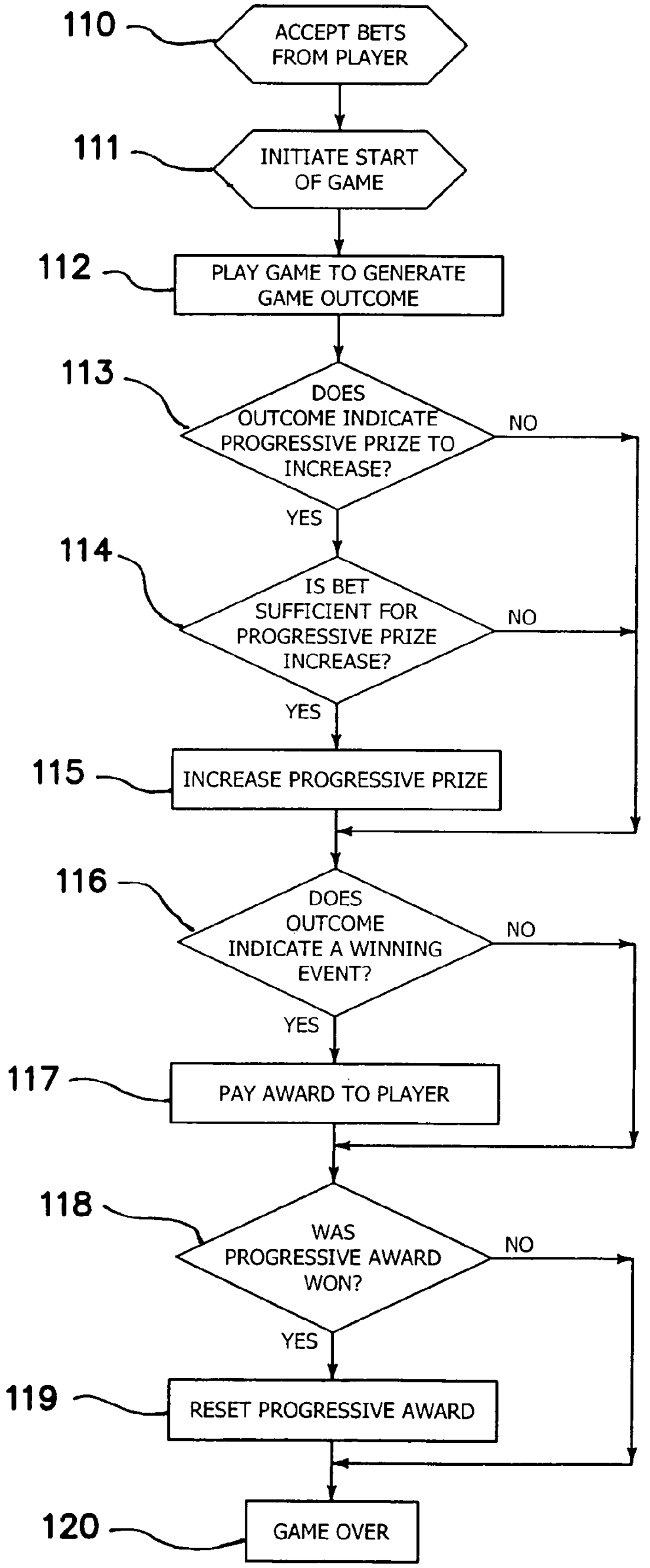
FIG. 1: Block diagram of a game embodiment having a random progressive advancement.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Turning to the drawings, FIG. 1 shows a block diagram 100 detailing one game embodiment of the present invention, namely a game having a random increase in a progressive award value based upon a game outcome. In the block diagram 100, a player first places a wager 110, initiates the game 111 and the game generates an outcome 112. Then, it is determined whether the outcome causes the progressive award value to increase 113. If yes, it is determined whether the player's wager amount is sufficient to cause the progressive award value to increase 114. In other words, increasing the progressive award amount is dependent upon the game outcome and the amount of the player wager. If the answer to the questions at steps 113 and 114 is positive, at step 115, the progressive award value is increased. If the answer to either one of the questions at steps 113 and 114 is negative, the progressive award value is not increased. It is next determined whether the game outcome is a winning outcome 116. If so, the player is paid an award 117. At step 118, it is determined whether the progressive award was won. If not, the game ends 120. If yes, the progressive award value is re-set 119.

It is noted that in block diagram 100, the nature of the game outcome required to cause a progressive award increase is not explicitly stated in accordance with the ability of the embodiments of the present invention to apply to either primary game outcomes and/or secondary game outcomes.

Figure 2:
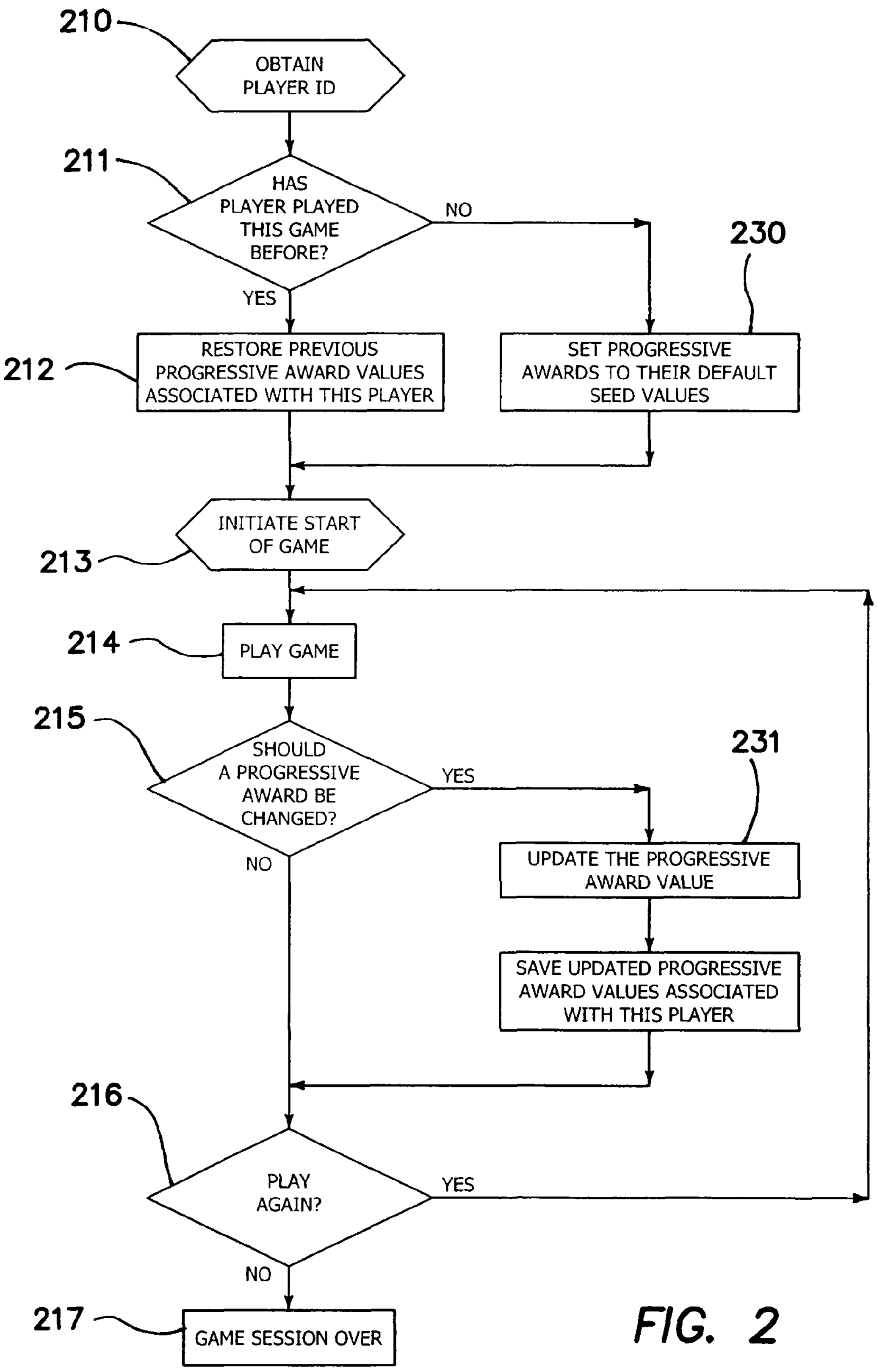
FIG. 2: Block diagram of a game embodiment having a personal progressive award.

FIG. 2 shows a block diagram 200 detailing another embodiment of the present invention, namely a game having a non-linked progressive award whereby progressive award gains carry over between play sessions. In such an embodiment, a player tracking system maintains the carry over of the progressive award in a player file and/or database. To that extent, block diagram 200 details a player playing one or more games (e.g., machine, device or Internet interface) during a single gaming session where each of the games played during the gaming session are associated with the same identified player.

Initially a player tracking system in communication with the game identifies the player 210 and determines whether the player is a repeat player or first time player 211. If the player is a repeat player, the progressive award values are set to the previous values after a last gaming session 212. If the player is not a repeat player, the progressive award values are set to their default seed values 230. The game is then initiated 213 and a game outcome generated 214. Based on the game outcome generated at step 214, it is then determined whether a progressive award should be increased 215. If so, the progressive award value is increased 231 and saved in association with the identified player 232. The player then elects to play the game again 215 or end the game 217. In this configuration the progressive award values are personal to the player and are maintained by a player tracking system.

Figure 3:
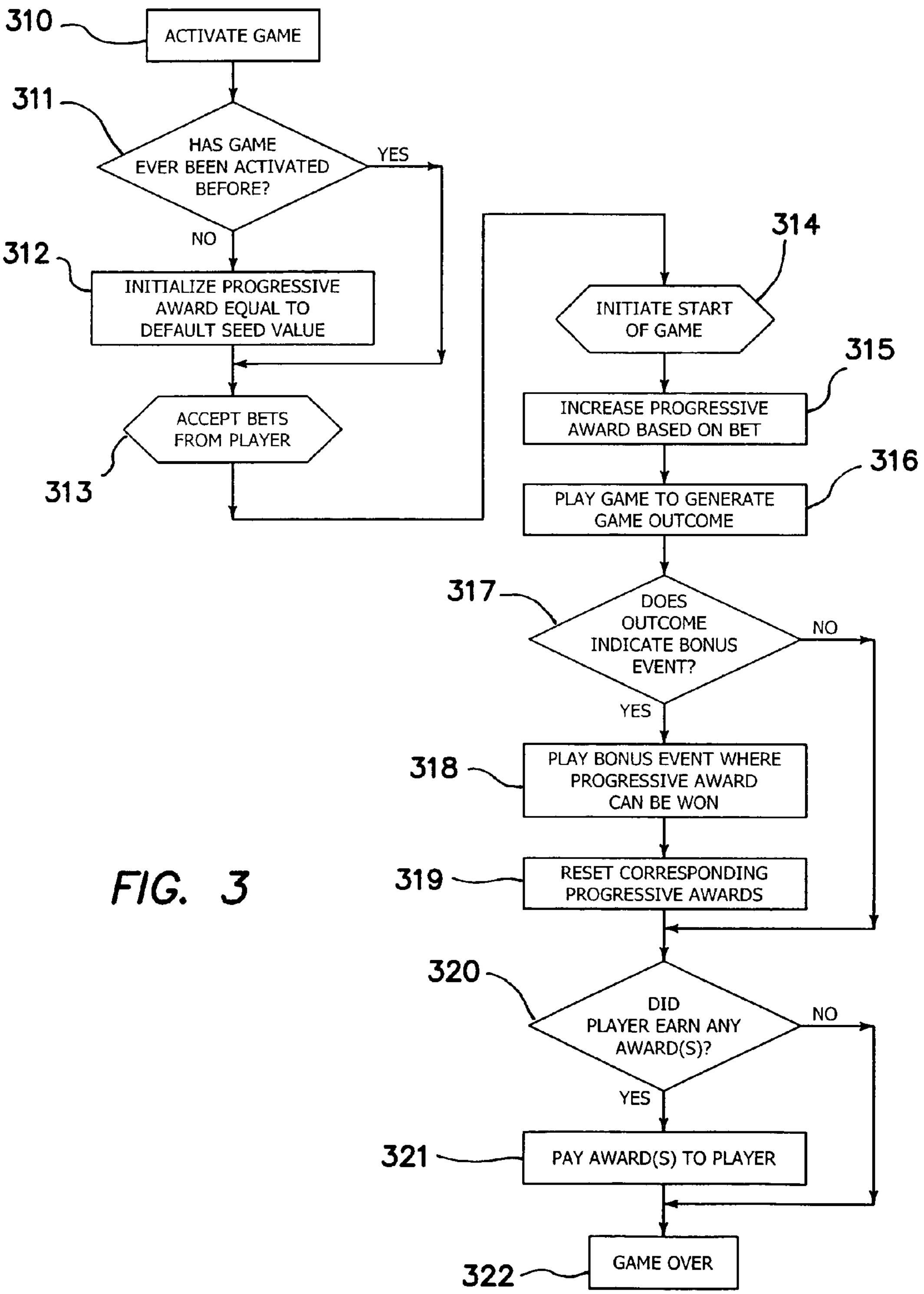
FIG. 3: Block diagram of a game embodiment having a bonus round progressive award (constant advance)

FIG. 3 shows a block diagram 300 detailing another embodiment of the present invention, namely a game having a progressive award that can only be won in a bonus round, and whether or not the progressive award is won, it is reset after the bonus round concludes. The block diagram 300 also takes into account the initial establishment of the progressive award value. It is based on a standard method of increasing the progressive award as a percentage of every eligible wager.

The game is first activated 310 and it is then determined if the game has been activated previously 311. If not, the progressive award value is set at the initial/default seed value 312. Wagers are then accepted from a subject player 313 and the game is initiated by the player 314. Based on the wager amount, the progressive award value is increased 315 and the game is played 316 thus generating a game outcome. It is then determined if the game outcome triggers a bonus event 317. If the game outcome does trigger a bonus event, a bonus game is played during which the progressive award(s) may be won 318. After the bonus game is played, the progressive award values are reset 319. It is then determined whether the player earned any awards 320 and if so, the awards are credited to the player 321. The game ends at step 322.

Figure 4:
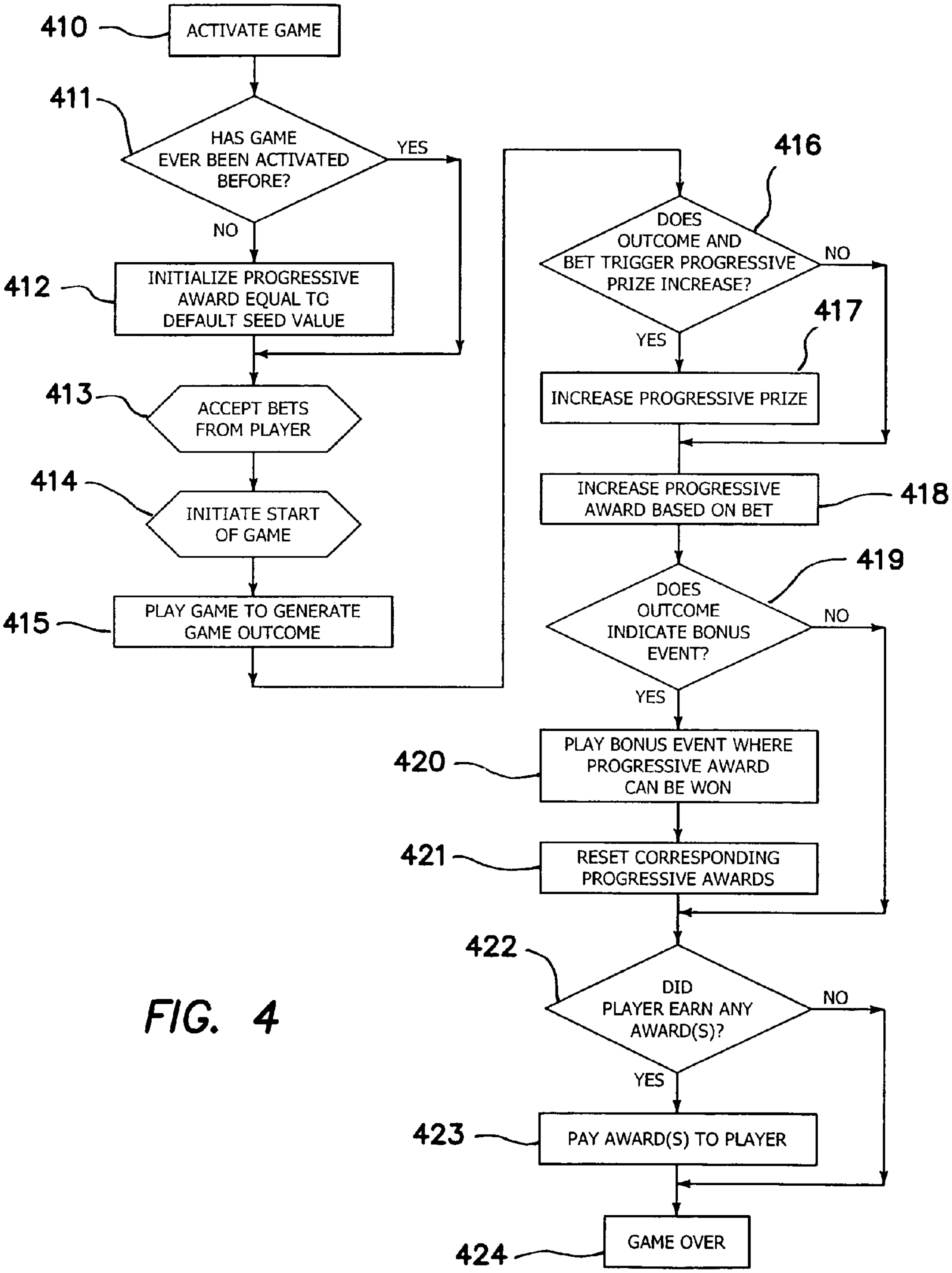
FIG. 4: Block diagram of game embodiment having a bonus round progressive award (random advance)

FIG. 4 shows a block diagram 400 similar to block diagram 300. However, it details an innovative method of randomly increasing the progressive award as described in the embodiments of the present invention.

The game is first activated 410 and it is then determined if the game has been activated previously 411. If not, the progressive award value is set at the initial/default seed value 412. Wagers are then accepted from a subject player 413 and the game is initiated by the player 414 and a game outcome is generated 415. It is then determined if the game outcome triggers a progressive award value increase 416. If yes, the progressive award value is increased 417 and then the progressive award value is increased based on the wager amount 418. It is then determined whether the game outcome triggers a bonus event 419. The bonus game is then played 420 and after the bonus game is played, the progressive award values are reset 421. It is then determined whether the player earned any awards 422 and if so, the awards are credited to the player 423. The game ends at step 424.

Figure 5:
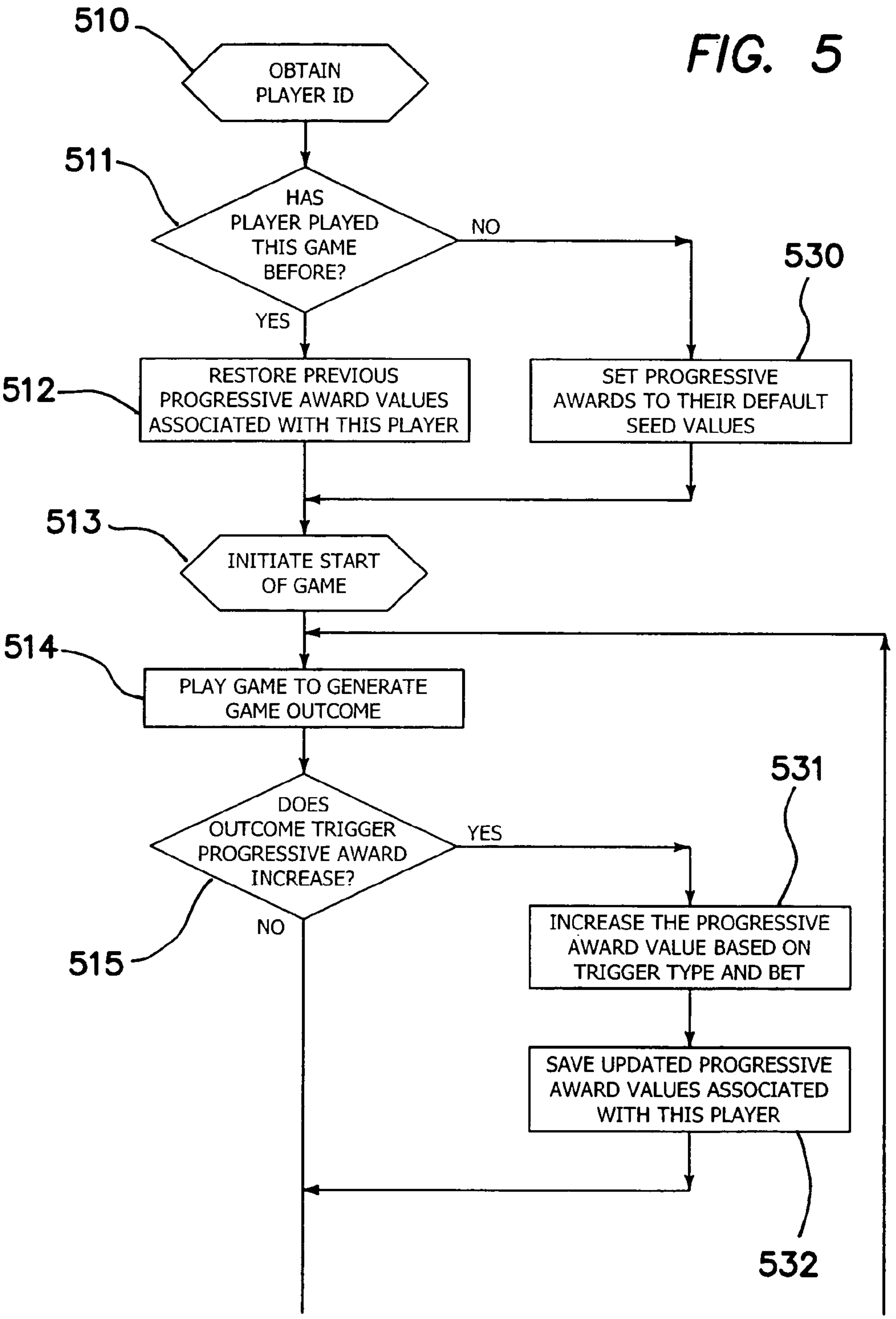
FIG. 5: Block diagram of one exemplary game play.
Figure 5:
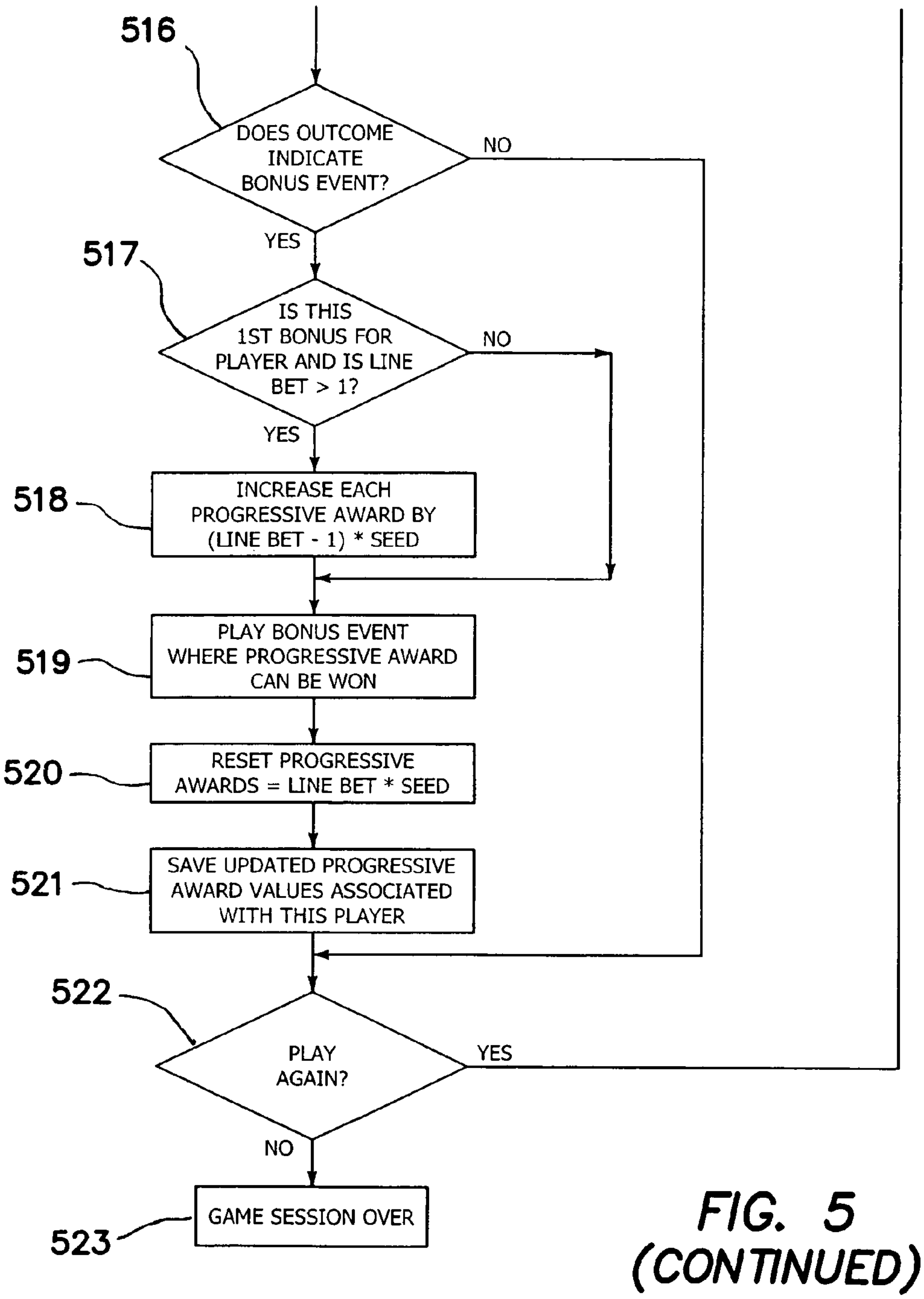

FIG. 5 shows a block diagram 500 detailing an exemplary gaming system and game which combines a number of inventive components in a single game. The player ID is obtained 510 and it is determined whether the player has played previously 511. If the player has not played previously, the progressive award values are set to their default seed values 530, else the progressive award values are restored to their values corresponding to their values the last time said player played said game 512. The player initiates the game 513 which generates a game outcome 514. If the game outcome matches required outcome necessary to trigger a progressive award increase 515, the corresponding progressive award value is increased 531 and the updated value is saved 532. Block diagram 500 applies whether the progressive award increase triggering outcome is based on the primary game outcome or based on a secondary game outcome. It is then determined whether the game outcome triggers a bonus outcome 516. If the game outcome triggers a bonus round, the pay line wager which activated the bonus round is examined to determine if it is greater than one unit 517. If the activating pay line wager is greater than one unit, the progressive awards are increased based upon a difference between the activating pay line wager and one unit 518. Then, the bonus event is played during which the player has the chance of winning at least one of the progressive awards 519. When the bonus event concludes, whether or not any progressive award is earned by the player, the progressive awards are reset 520 and stored 521. The player can then play again 522 or can end his or her play session 523.

Figure 6:
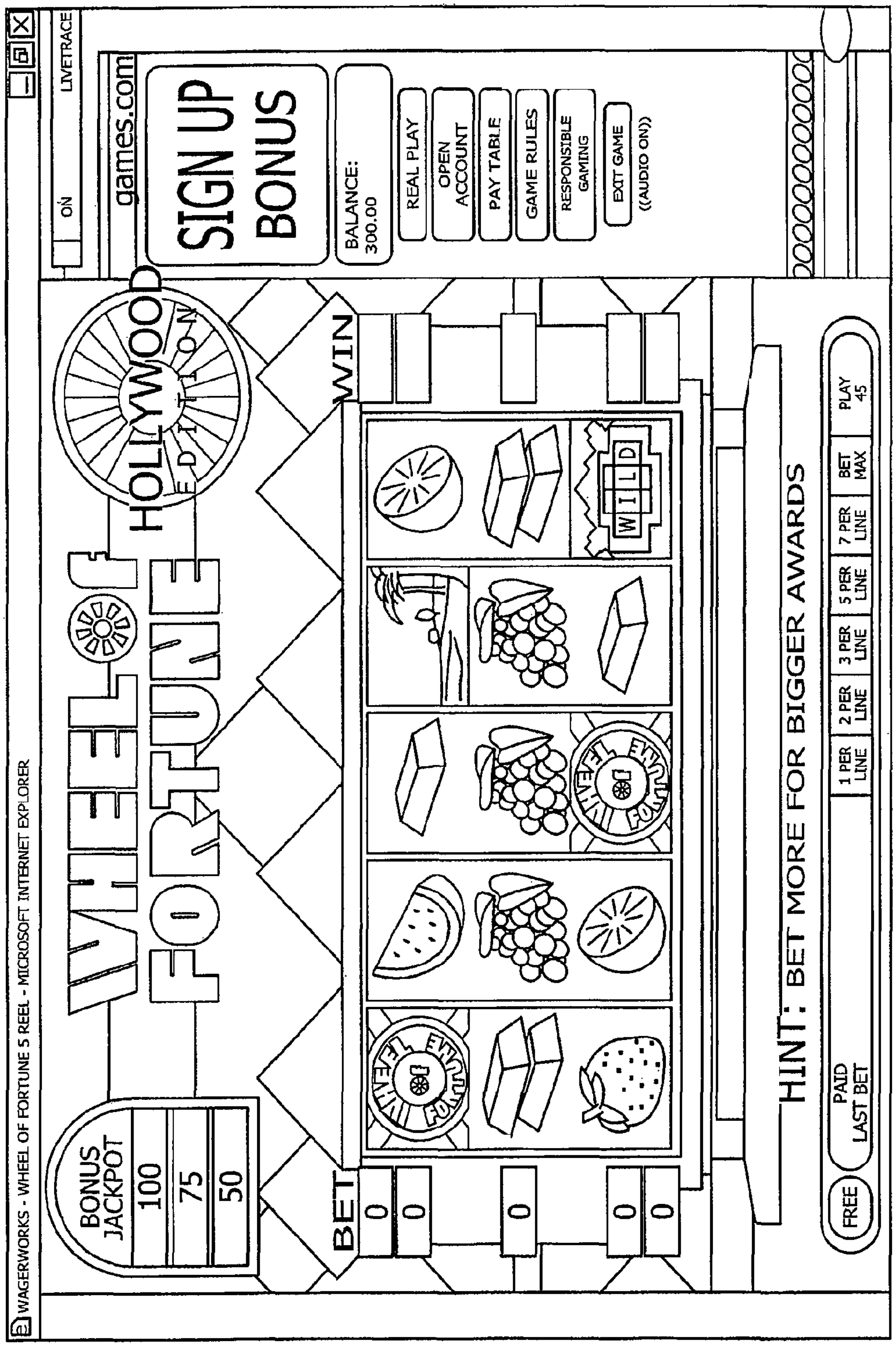
FIG. 6: Screen shot of exemplary game with said screen displaying initial Jackpot seed related to 1st game play.

FIG. 6 shows a screen shot from an exemplary game featuring some of aspects of the embodiments of the present invention. The screen shot shows three progressive awards, referred to as top progressive 610, middle progressive 620 and bottom progressive 630. When the game is played by a player for the first time, the progressive awards are, for example, set to 100 units, 75 units and 50 units, respectively.

Figure 7:
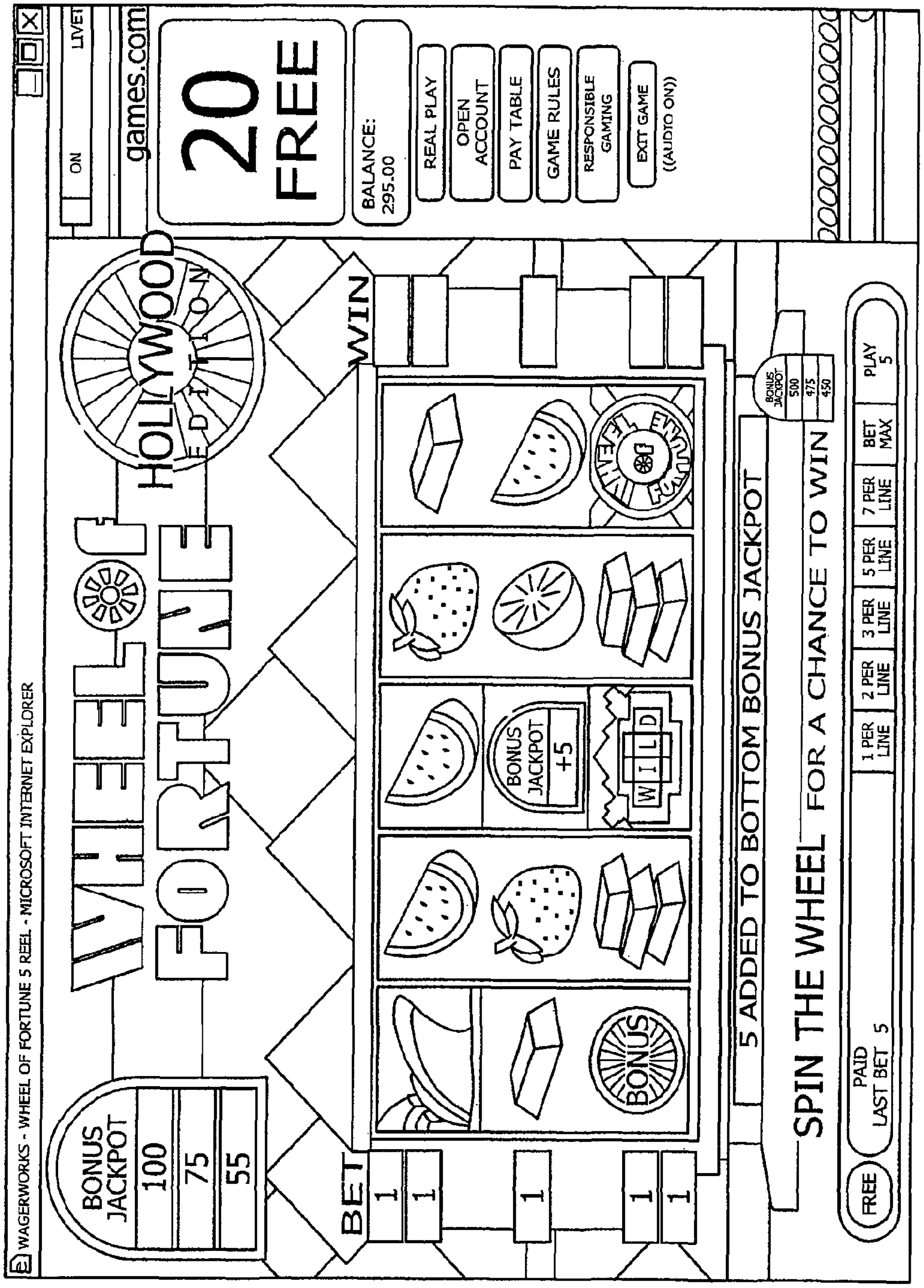
FIG. 7: Screen shot of exemplary game with said screen displaying wager amount added to bottom award.
Figure 8:
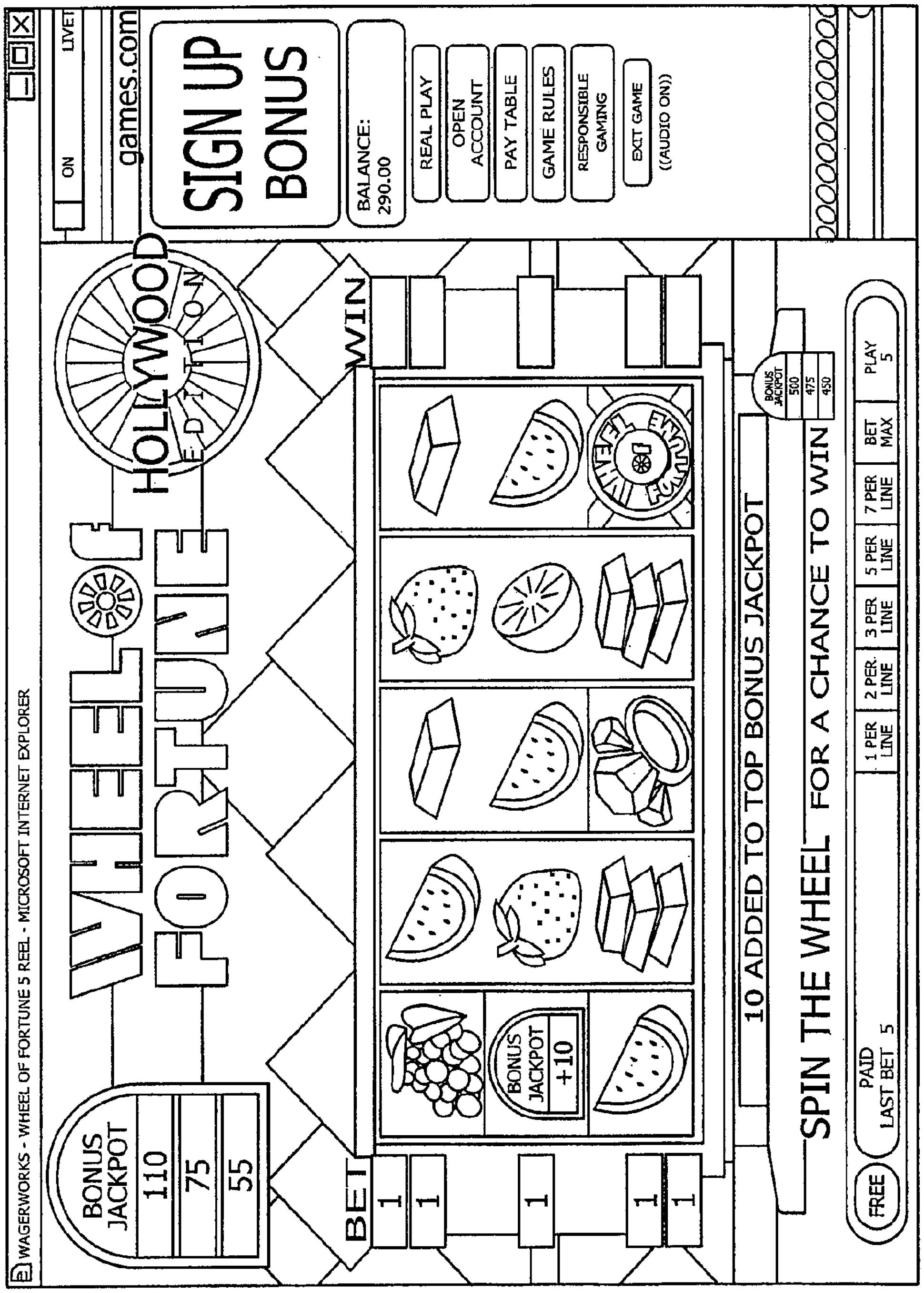
FIG. 8: Screen shot of exemplary game with said screen displaying 2×wager amount added to top award.

FIG. 7 shows a successive screen shot which follows from FIG. 6. A jackpot symbol 640 appears on the third reel, which in one embodiment of the present invention causes the bottom progressive award 630 to increase by a total amount of the wager such that the new value becomes 55 units (i.e., 50 units+5 units=55 units.). FIG. 8 shows another screen shot. A jackpot symbol 650 appears on the first reel, which in one embodiment of the present invention causes the top progressive award 610 to increase by twice a total amount of the wager such that the new value becomes 110 units (i.e., 100 units+2*5 units=110 units).

Figure 9:
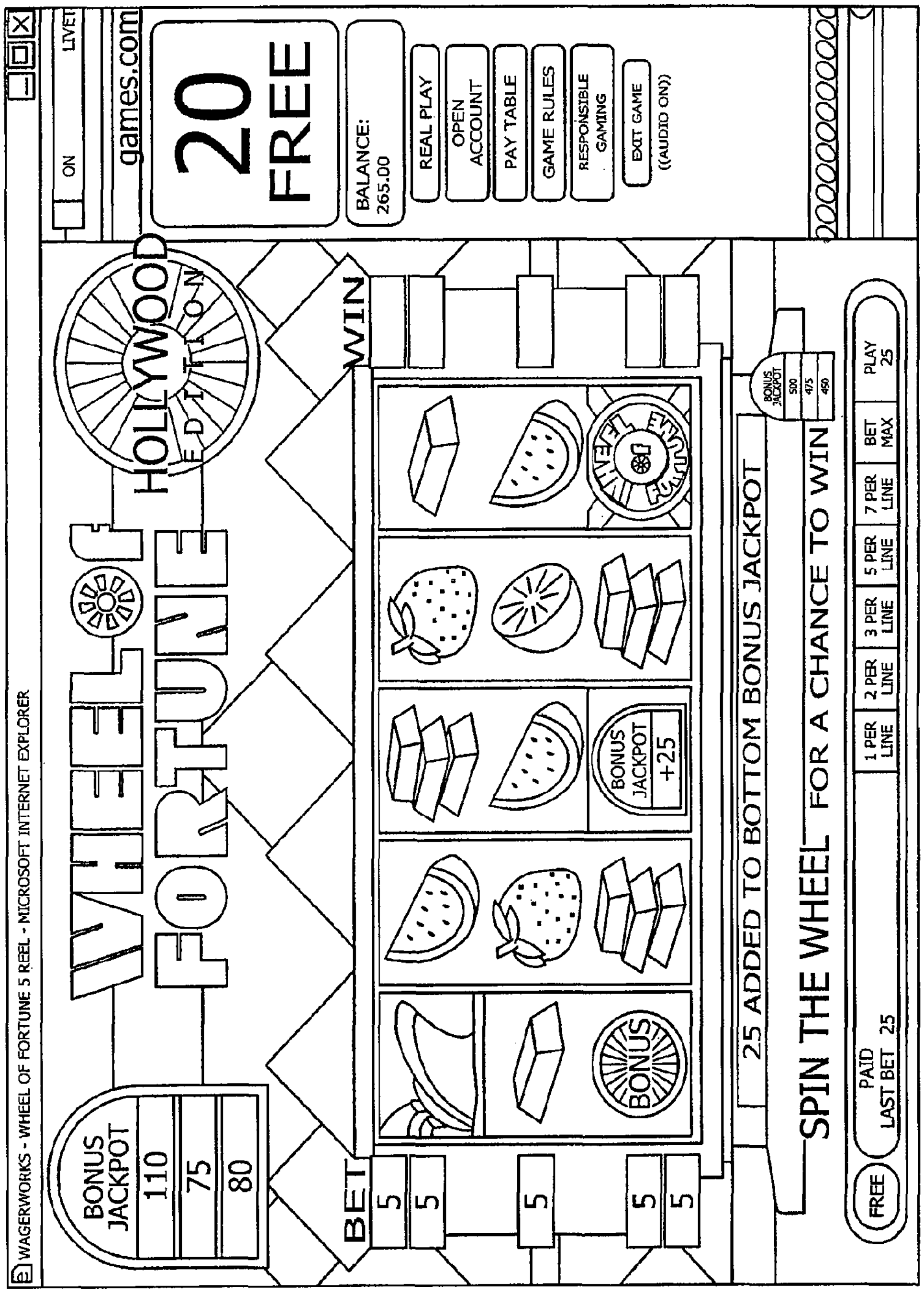
FIG. 9: Screen shot of exemplary game with said screen displaying correspondence between larger wager amount and larger award increases.
Figure 10:
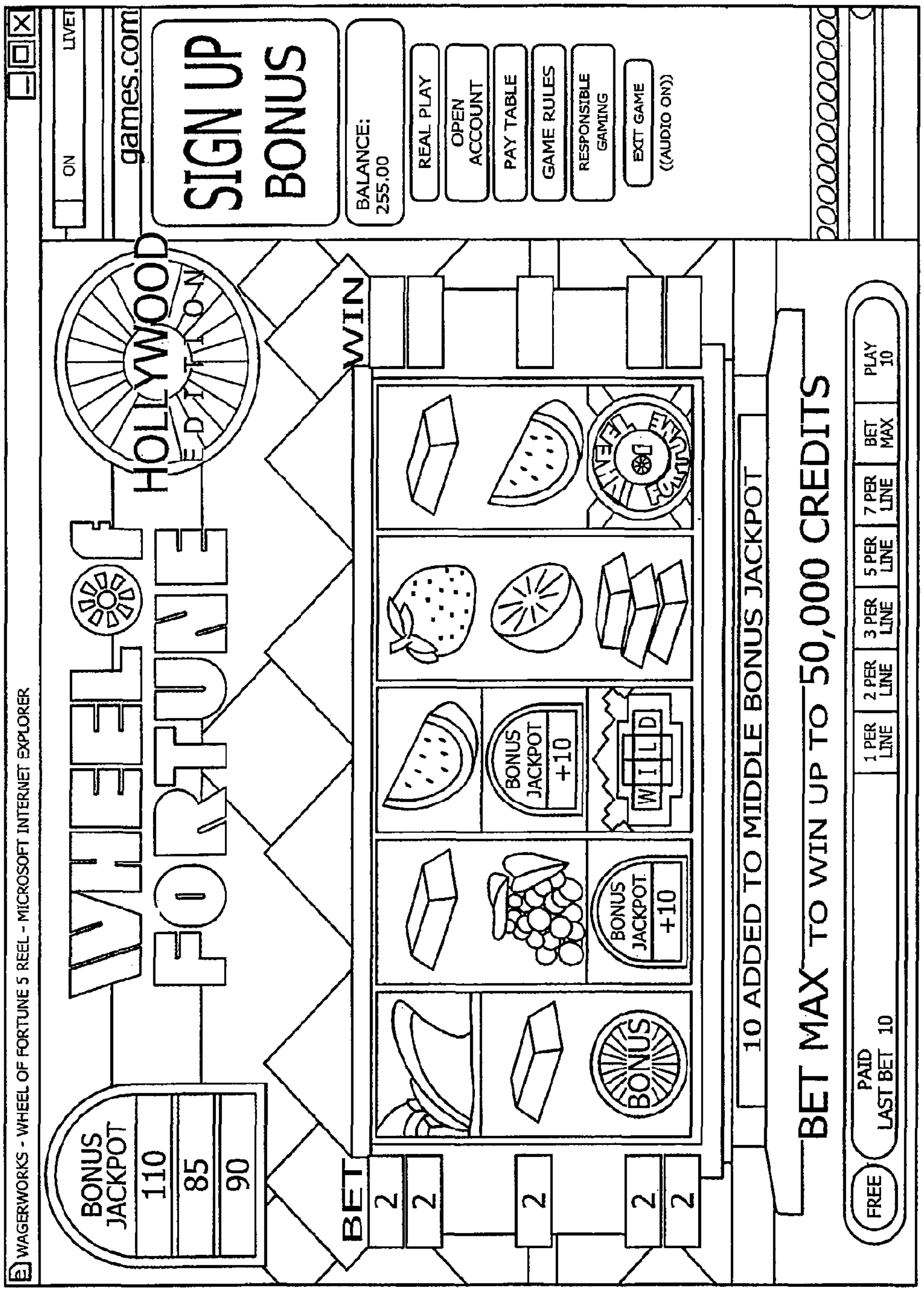
FIG. 10: Screen shot of exemplary game with said screen displaying multiple award increases.

FIG. 9 shows another screen shot. A jackpot symbol 660 appears on the third reel, which in one embodiment of the present invention causes the bottom progressive award 630 to increase by a total amount of the wager. Since in this screen shot, the wager size is 25 units, the new value becomes 80 units (i.e., 55 units+25 units=80 units). FIG. 10 show another screen shot demonstrating that multiple progressive award increase triggering events may occur simultaneously. As shown, two different progressive awards are increased. The jackpot symbol 670 on the 2nd reel causes the middle progressive award 620 to increase while the jackpot symbol 680 on the 3rd reel causes the bottom progressive award 630 to increase. A game message area 680 shown in the screen shot indicates that "10 Added to Middle Bonus Jackpot", however, this is a dynamic display area which also displays other messages which, in this example, would also include "10 Added to Bottom Bonus Jackpot".

Figure 11:
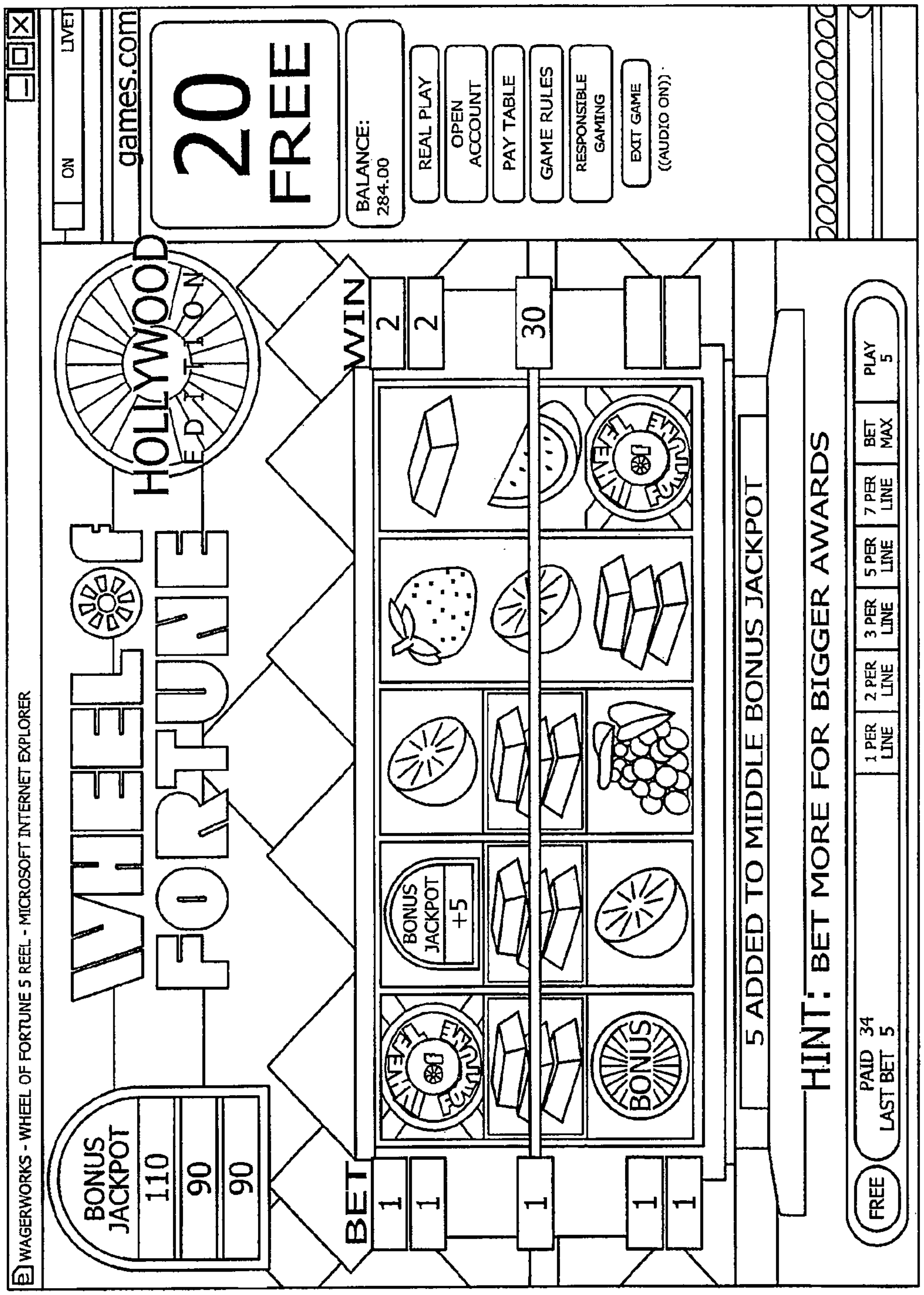
FIG. 11: Screen shot of exemplary game with said screen displaying a winning outcome and corresponding award increase.

FIG. 11 shows another screen shot demonstrating that progressive award increase triggers and primary game winning outcomes may occur simultaneously. As shown 32 units 690 are won based, on the game outcome defined by the symbols on the reels and the middle progressive award value 620 has been increased.

Figure 12:
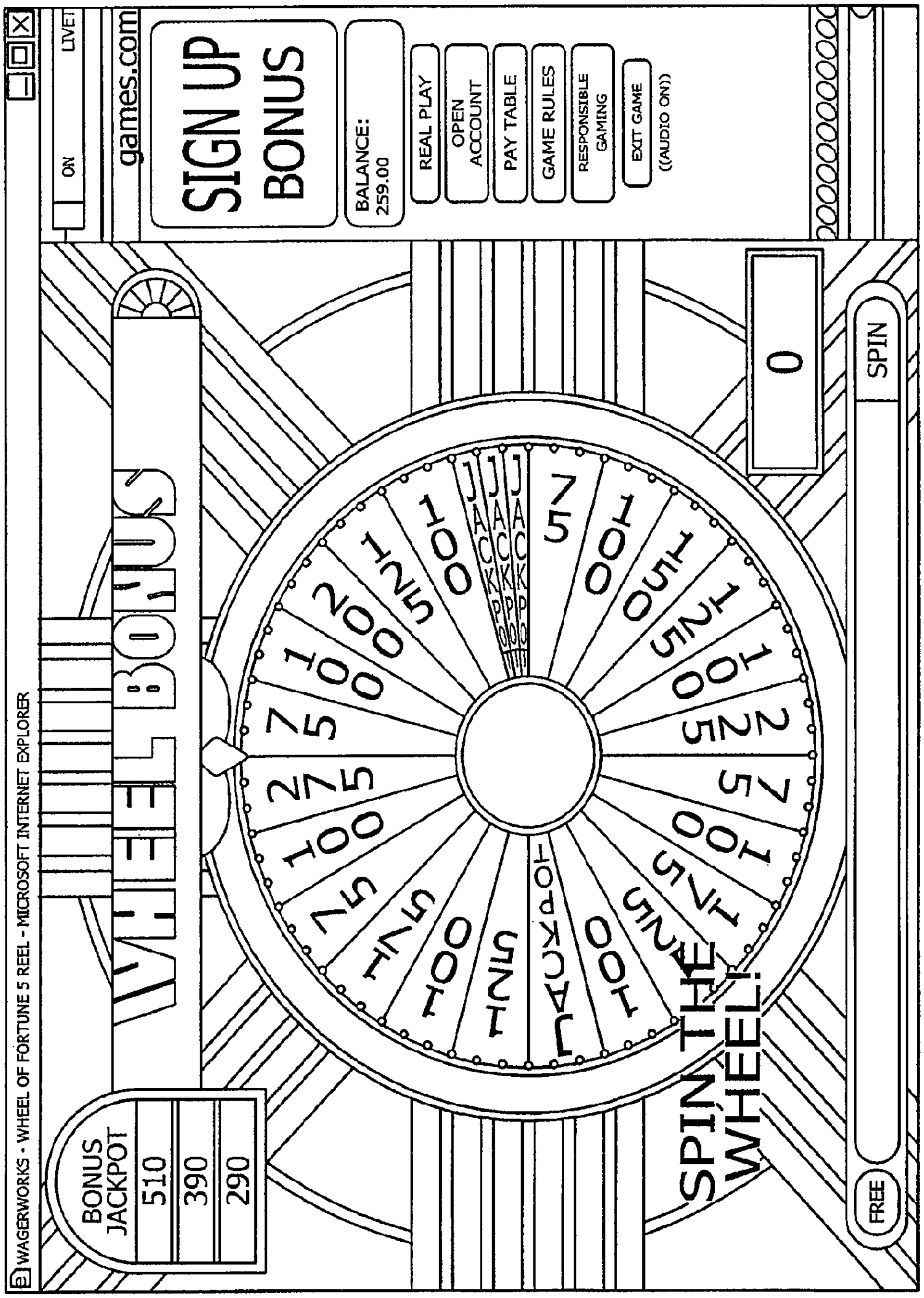
FIG. 12: Screen shot of exemplary game with said screen displaying a start of a bonus game w/pay line wager of 5 units causing one time awards boost.

FIG. 12 shows another screen shot. A primary game has triggered a bonus event with a wager of 5 units on the pay line which activated the bonus. The progressive award values, which were 110 units, 90 units and 90 units, respectively, prior to the start of the bonus round have been boosted. At the start of the bonus round, the progressive award values 610-630 have been boosted to 510 units, 390 units and 290 units, which corresponds to a boost of 400 units, 300 units and 200 units, respectively, which is based on the fact that the activating wager was 5 units. Therefore, each boost was calculated as Activating Pay Line Wager−1 unit)*Seed, or (5−1)*Seed, or specifically, 4*100 units=400 units, 4*75=300 units and 4*50 units=200 units. The screen shot also indicates that the progressive awards can be won within this bonus round as noted by the color coded slices 700 on the bonus wheel labeled "Jackpot".

Figure 13:
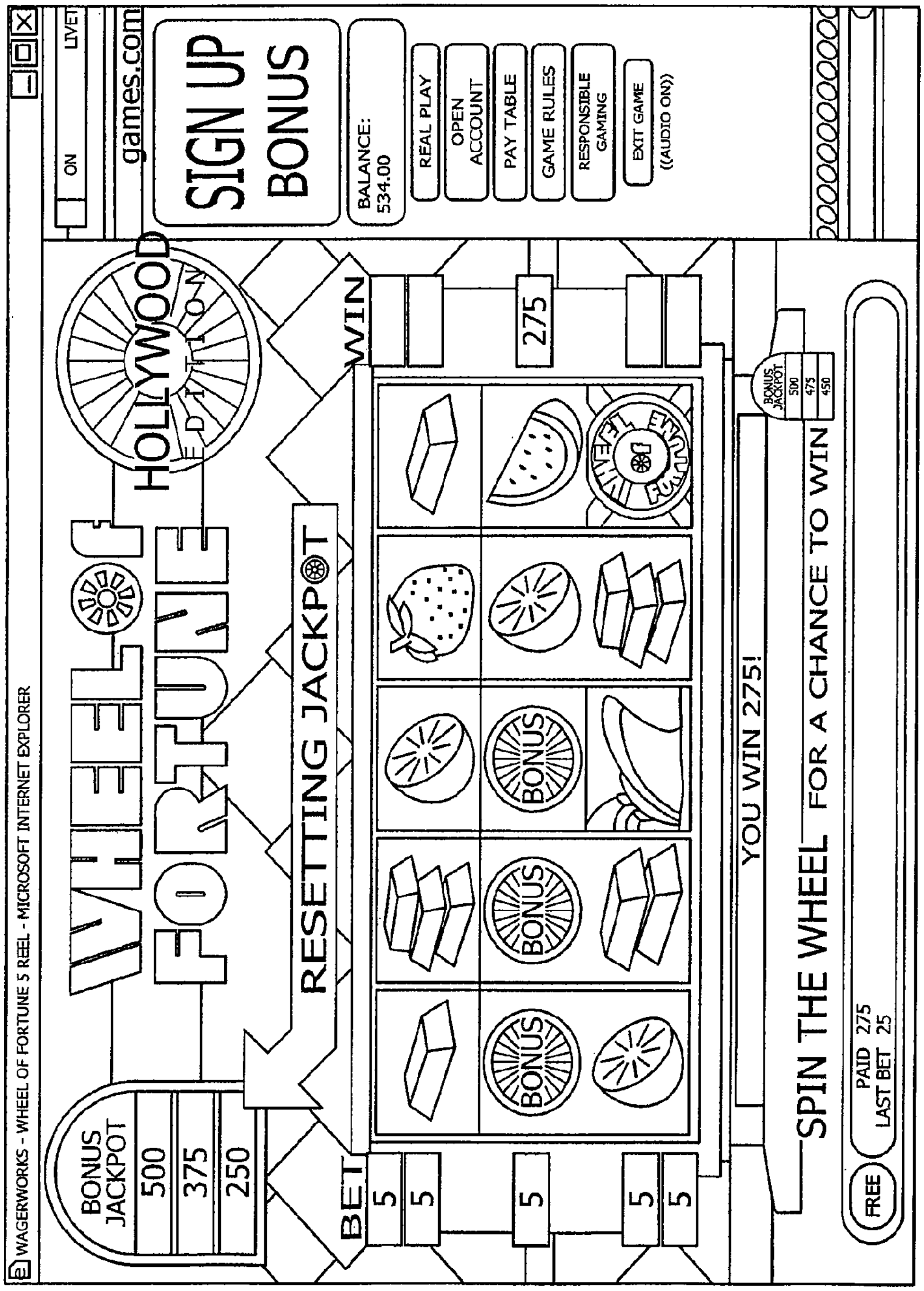
FIG. 13: Screen shot of exemplary game with said screen displaying reset pf awards after bonus game concludes.

FIG. 13 shows another screen shot. The screen shot shows the status if the game after the completion of the bonus round with a 5 unit activating pay line wager. The progressive award values are therefore set to values calculated as Activating Pay Line Wager*Seed or 5*Seed, or specifically, 5*100 units=500 units, 5*75 units=375 units and 5*50 units=250 units Although the invention has been described in detail with reference to several embodiments, additional variations and modifications exist within the scope and spirit of the invention as described and defined in the following claims.

The invention claimed is:

1. A gaming system comprising:

at least one input device;

at least one display device;

at least one processor; and at least one memory device which stores a plurality of instructions, which when executed by the at least one processor, cause the at least one processor to operate with said at least one display device, and said at least one input device to:

(a) enable a player to place a wager on a play of a primary game;

(b) randomly generate a primary game outcome from a plurality of different primary game outcomes, at least one of the primary game outcomes associated with at least one bonus trigger condition and at least one, but not all, of the primary game outcomes associated with at least one progressive award increase condition for a progressive award;

(c) automatically increase a value of the progressive award if the randomly generated primary game outcome corresponds to the at least one progressive award increase condition, an amount of said increase based on said randomly generated primary game outcome;

(d) if the randomly generated primary game outcome corresponds to one of a plurality of different winning primary game outcomes:

(i) provide the player an award associated with the randomly generated primary game outcome, and (ii) if the provided award associated with the randomly generated primary game outcome is the progressive award, reset the progressive award to an initial value; and (e) if the randomly generated primary game outcome corresponds to the at least one bonus trigger condition:

(i) trigger a play of a bonus game, and (ii) for each triggered play of the bonus game:

(A) randomly generate a bonus game outcome from a plurality of different bonus game outcomes, at least one of the bonus game outcomes associated with the at least one progressive award increase condition for the progressive award, (B) automatically increase the value of the progressive award if the randomly generated bonus game outcome corresponds to the at least one progressive award increase condition, the amount of said increase based on the randomly generated bonus game outcome, (C) provide the player any award associated with the randomly generated bonus game outcome, and (D) reset the progressive award to the initial value upon concluding play of the bonus game.

2. The gaming system of claim 1, wherein when executed by the at least one processor, the plurality of instructions cause the at least one processor to reset the progressive award to the initial value if, prior to concluding play of the bonus game, the provided award associated with the randomly generated bonus game outcome is the progressive award.

3. The gaming system of claim 1, wherein when executed by the at least one processor, the plurality of instructions cause the at least one processor to increase the value of the progressive award by an amount based, at least in part, on an amount of the placed wager.

4. The gaming system of claim 1, wherein when executed by the at least one processor, the plurality of instructions cause the at least one processor to increase the value of the progressive award based on a plurality of plays of a plurality of primary games.

5. The gaming system of claim 1, wherein when executed by the at least one processor, the plurality of instructions cause the at least one processor to cause a plurality of reels to display the randomly generated primary game outcome.

6. A gaming system comprising:

at least one input device;

at least one display device;

at least one processor; and at least one memory device which stores a plurality of instructions, which when executed by the at least one processor, cause the at least one processor to operate with said at least one display device, and said at least one input device to:

(a) maintain a plurality of progressive awards, each of said progressive awards having an initial progressive award value;

(b) enable a player to place a wager on a play of a primary game;

(c) if the placed wager is at least a designated wager level, increase a progressive award value of at least one of said progressive awards;

(d) cause a plurality of reels to display a randomly generated primary game outcome;

(e) automatically increase the progressive award value of at least one of said progressive awards if the displayed randomly generated primary game outcome corresponds to an award increase condition for said at least one progressive award, an amount of said increase is based on the randomly generated primary game outcome;

(f) if the displayed randomly generated primary game outcome corresponds to one of a plurality of different winning primary game outcomes, provide an award associated with the displayed generated primary game outcome;

(g) if any of the progressive awards are provided to the player, reset said progressive award value of said provided progressive award to said initial progressive award value associated with said provided progressive award; and (h) in response to the randomly generated primary game outcome corresponding to a bonus event triggering game outcome:

(i) initiate a bonus round, and (ii) for each initiated bonus round:

(A) provide any award associated with a bonus round outcome; and (B) upon concluding play of the initiated bonus round, for each of the progressive awards, reset the progressive award value of said progressive award to the initial progressive award value associated with said progressive award.

7. The gaming system of claim 6, wherein the primary game outcome includes a plurality of symbols.

8. The gaming system of claim 7, wherein when executed by the at least one processor, the plurality of instructions cause the at least one processor to automatically increase the progressive award value of one of the progressive awards if a designated one of the symbols is displayed in association with the randomly generated game outcome, an amount of said increase is based on the displayed designated symbol.

9. The gaming system of claim 6, wherein when executed by the at least one processor, the plurality of instructions cause the at least one processor to increase the progressive award value of at least one of the progressive awards based, at least in part, on an amount of the wager.

10. The gaming system of claim 6, wherein when executed by the at least one processor, the plurality of instructions cause the at least one processor to increase at least one of progressive award values of at least one of the progressive awards when the bonus round is triggered but before the bonus round is played.

11. A method of operating a gaming system, said method comprising:

(a) enable a player to place a wager on a play of a primary game;

(b) causing at least one processor to execute a plurality of instructions to randomly generate a primary game outcome from a plurality of different primary game outcomes, at least one of the primary game outcomes associated with at least one bonus trigger condition and at least one, but not all, of the primary game outcomes associated with at least one progressive award increase condition for a progressive award;

(c) causing the at least one processor to execute the plurality of instructions to automatically increase a value of the progressive award if the randomly generated primary game outcome corresponds to the at least one progressive award increase condition, an amount of said increase based on said randomly generated primary game outcome;

(d) if the randomly generated primary game outcome corresponds to one of a plurality of different winning primary game outcomes:

(i) providing the player an award associated with the randomly generated primary game outcome, and (ii) if the provided award associated with the randomly generated primary game outcome is the progressive award, causing the at least one processor to execute the plurality of instructions to reset the progressive award to an initial value; and (e) if the randomly generated primary game outcome corresponds to the at least one bonus trigger condition:

(i) trigger a play of a bonus game, and (ii) for each triggered play of the bonus game:

(A) causing the at least one processor to execute the plurality of instructions to randomly generate a bonus game outcome from a plurality of different bonus game outcomes, at least one of the bonus game outcomes associated with the at least one progressive award increase condition for the progressive award, (B) causing the at least one processor to execute the plurality of instructions to automatically increase the value of the progressive award if the randomly generated bonus game outcome corresponds to the at least one progressive award increase condition, the amount of said increase based on the randomly generated bonus game outcome, (C) providing the player any award associated with the randomly generated bonus game outcome, and (D) causing the at least one processor to execute the plurality of instructions to reset the progressive award to the initial value upon concluding play of the bonus game.

12. The method of claim 11, which includes causing the at least one processor to execute the plurality of instructions to reset the progressive award to the initial value if, prior to concluding play of the bonus game, the provided award associated with the randomly generated bonus game outcome is the progressive award.

13. The method of claim 11, which includes causing the at least one processor to execute the plurality of instructions to increase the value of the progressive award by an amount based, at least in part, on amount of the placed wager.

14. The method of claim 11, which includes causing the at least one processor to execute the plurality of instructions to increase the value of the progressive award based on a plurality of plays of a plurality of primary games.

15. The method of claim 11, which includes causing a plurality of reels to display the randomly generated primary game outcome.

16. The method of claim 11, which is provided through a data network.

17. The method of claim 16, wherein the data network is an internet.

18. A method of operating a gaming system, said method comprising:

(a) maintaining a plurality of progressive awards, each of said progressive awards associated with an initial progressive award value;

(b) enabling a player to place a wager on a play of a primary game;

(c) if the placed wager is at least a designated wager level, causing at least one processor to execute a plurality of instructions to increase a progressive award value of at least one of said progressive awards;

(d) causing a plurality of reels to display a randomly generated primary game outcome;

(e) causing the at least one processor to execute the plurality of instructions to automatically increase the progressive award value of at least one of said progressive awards if the displayed randomly generated primary game outcome corresponds to an award increase condition for said at least one progressive award, an amount of said increase is based on the randomly generated primary game outcome;

(f) if the displayed randomly generated primary game outcome corresponds to one of a plurality of different winning primary game outcomes, providing an award associated with the displayed generated primary game outcome;

(g) if any of the progressive awards are provided to the player, causing the at least one processor to execute the plurality of instructions to reset said progressive award value of said provided progressive award to said initial progressive award value associated with said provided progressive award; and (h) in response to the displayed randomly generated primary game outcome corresponding to a bonus event triggering game outcome:

(i) causing the at least one processor to execute the plurality of instructions to initiate a bonus round, and (ii) for each initiated bonus round:

(A) providing any award associated with a bonus round outcome; and (B) upon concluding play of the initiated bonus round, for each of the progressive awards, causing the at least one processor to execute the plurality of instructions to reset the progressive award value of said progressive award to the initial progressive award value associated with said progressive award.

19. The method of claim 18, wherein the primary game outcome includes a plurality of symbols.

20. The method of claim 19, which includes causing the at least one processor to execute the plurality of instructions to automatically increase the progressive award value of one of the progressive awards if a designated one of the symbols is displayed in association with the randomly generated game outcome, an amount of said increase is based on the displayed designated symbol.

21. The method of claim 18, which includes causing the at least one processor to execute the plurality of instructions to increase the progressive award value of at least one of the progressive awards based, at least in part, on an amount of the wager.

22. The method of claim 18, which includes causing the at least one processor to execute the plurality of instructions to increase at least one of progressive award values of at least one of the progressive awards when the bonus round is triggered but before the bonus round is played.

23. The method of claim 18, which is provided through a data network.

24. The method of claim 23, wherein the data network is an internet.

* * * * *

UNITED STATES PATENT AND TRADEMARK OFFICE
CERTIFICATE OF CORRECTION

PATENT NO. : 8,408,993 B2
APPLICATION NO. : 12/684355
DATED : April 2, 2013
INVENTOR(S) : Ernie M. Lafky et al.

It is certified that error appears in the above-identified patent and that said Letters Patent is hereby corrected as shown below:

IN THE CLAIMS

In Claim 1, Column 8, Line 39, delete ",".
In Claim 1, Column 9, Line 9, replace "the" with --an--.
In Claim 6, Column 9, Line 44, delete ",".
In Claim 6, Column 9, Line 52, replace "a" with --the--.
In Claim 6, Column 9, Line 60, replace "is" with --being--.
In Claim 6, Column 9, Line 66, between "displayed" and "generated" insert --randomly--.
In Claim 8, Column 10, Line 26, between "generated" and "game" insert --primary--.
In Claim 8, Column 10, Line 27, replace "is" with --being--.
In Claim 10, Column 10, Line 35, replace "at least one of" with --the--.
In Claim 10, Column 10, Line 36, replace "values" with --value--.
In Claim 11, Column 10, Line 41, replace "enable" with --enabling--.
In Claim 11, Column 11, Line 17, replace the first instance of "the" with --an--.
In Claim 18, Column 11, Line 55, replace "a progressive" with --the progressive--.
In Claim 18, Column 12, Line 7, replace "is" with --being--.
In Claim 18, Column 12, Line 12, between "displayed" and "generated" insert --randomly--.
In Claim 20, Column 12, Line 41, between "generated" and "game" insert --primary--.
In Claim 20, Column 12, Line 42, replace "is" with --being--.
In Claim 22, Column 12, Line 51, replace "at least one of" with --the-- and replace "values" with --value--.

Signed and Sealed this
Twenty-ninth Day of October, 2013

Teresa Stanek Rea
*Deputy Director of the United States Patent and Trademark Office*